United States Patent
Seliger et al.

(10) Patent No.: US 12,516,966 B1
(45) Date of Patent: Jan. 6, 2026

(54) SMART BUILDING SENSING DEVICE WITH FIELD REPLACEABLE SENSORS

(71) Applicant: Arctevity Inc., Woburn, MA (US)

(72) Inventors: Robert Seliger, Beverly, MA (US); Christopher Egan, Concord, NH (US); Alexander William Seiger, Manchester, NH (US)

(73) Assignee: Arctevity Inc., Woburn, MA (US)

( * ) Notice: Subject to any disclaimer, the term of this patent is extended or adjusted under 35 U.S.C. 154(b) by 278 days.

(21) Appl. No.: 17/979,845

(22) Filed: Nov. 3, 2022

Related U.S. Application Data

(60) Provisional application No. 63/275,570, filed on Nov. 4, 2021.

(51) Int. Cl.
| | |
|---|---|
| *G01D 11/30* | (2006.01) |
| *H01R 12/79* | (2011.01) |
| *H01R 33/94* | (2006.01) |
| *H01R 33/945* | (2006.01) |

(52) U.S. Cl.
CPC ............ *G01D 11/30* (2013.01); *H01R 33/94* (2013.01); *H01R 12/79* (2013.01); *H01R 33/945* (2013.01); *H01R 2201/20* (2013.01)

(58) Field of Classification Search
None
See application file for complete search history.

(56) References Cited

U.S. PATENT DOCUMENTS

| | | | | |
|---|---|---|---|---|
| 5,183,410 | A * | 2/1993 | Inaba ................. | H01R 13/6272 |
| | | | | 439/354 |
| 6,036,524 | A * | 3/2000 | Suzuki ................ | H01R 13/635 |
| | | | | 439/923 |
| 10,826,236 | B2 * | 11/2020 | Kohen .................. | H01R 24/66 |
| 2010/0130055 | A1* | 5/2010 | Liang ..................... | E04B 9/244 |
| | | | | 439/532 |
| 2010/0200664 | A1* | 8/2010 | Drew ................... | G01N 33/004 |
| | | | | 236/94 |
| 2017/0146260 | A1* | 5/2017 | Ribbich ............ | G05B 19/0426 |
| 2018/0059694 | A1* | 3/2018 | Rezny .................... | F24F 11/30 |
| 2018/0115131 | A1* | 4/2018 | Kohen ............... | H01R 13/7038 |

* cited by examiner

*Primary Examiner* — Mark A Shabman
(74) *Attorney, Agent, or Firm* — Cesari and McKenna, LLP

(57) ABSTRACT

A sensing device includes an enclosure, a sensor assembly with sensors, a PCB assembly, and a flexible jumper. The flexible jumper includes first and second ends. The first end couples to the sensor assembly. The second end couples to the PCB assembly. The sensor assembly is decoupled from the first end of the flexible jumper and removed from the enclosure without decoupling the second end from the PCB assembly and without removing the PCB assembly from the enclosure. The sensing device may be installed in a wall or utility box in a building, without the need to configure or modify the building infrastructure to replace sensors. This provides a practical way to enable sensors to be replaced for repair, to install new sensors as they are introduced to the market, or to change the sensors to meet changes in user needs or building use cases.

16 Claims, 23 Drawing Sheets

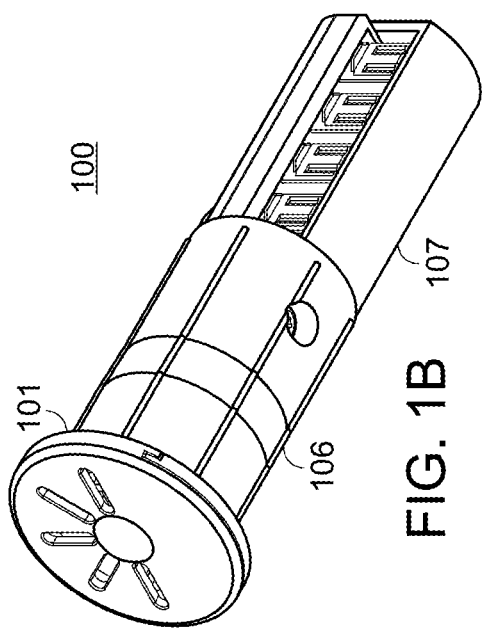
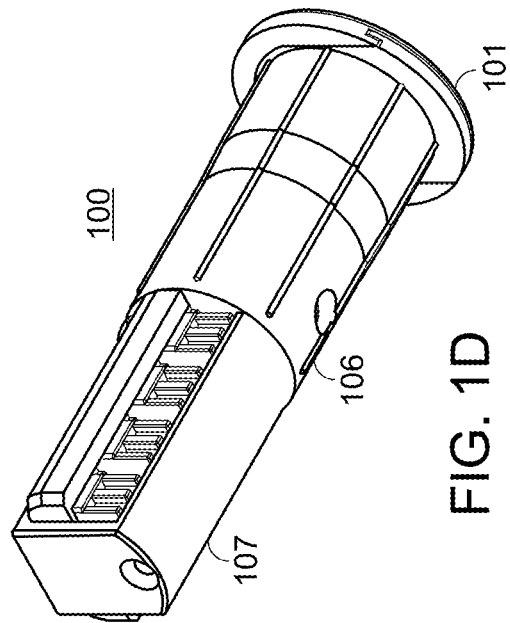
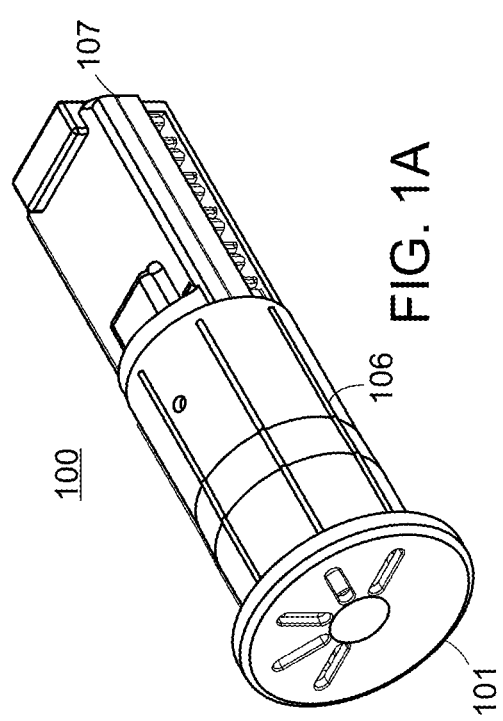
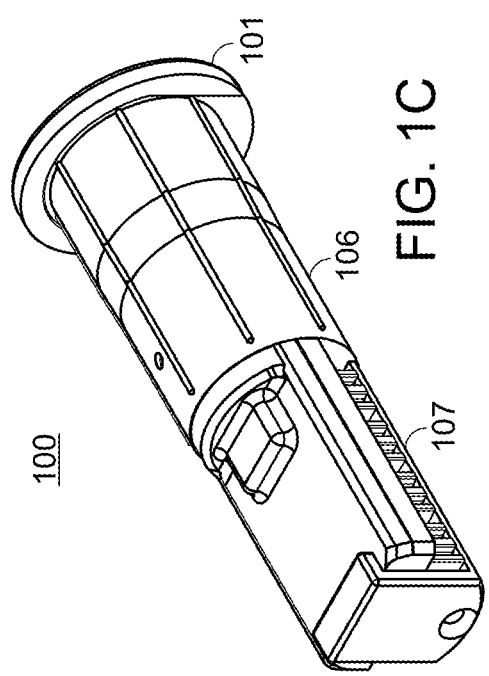

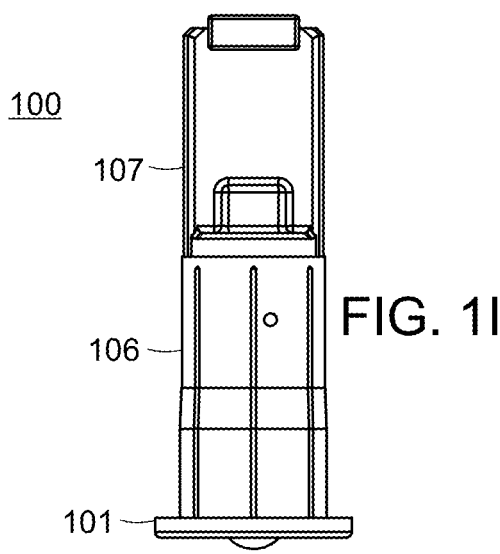
FIG. 1I
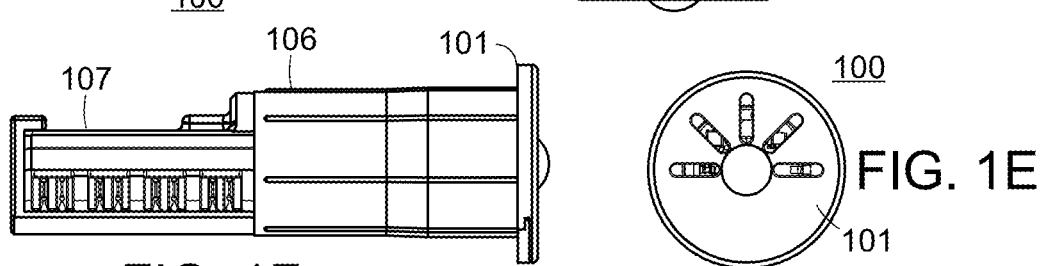
FIG. 1F
FIG. 1E
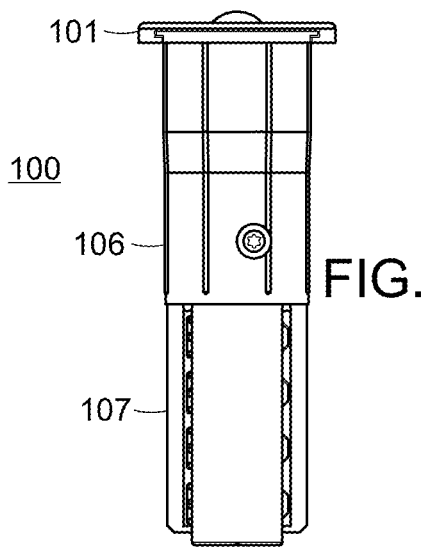
FIG. 1J
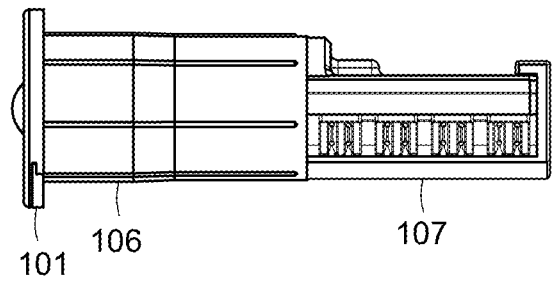
FIG. 1G
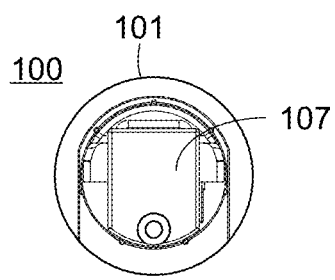
FIG. 1H

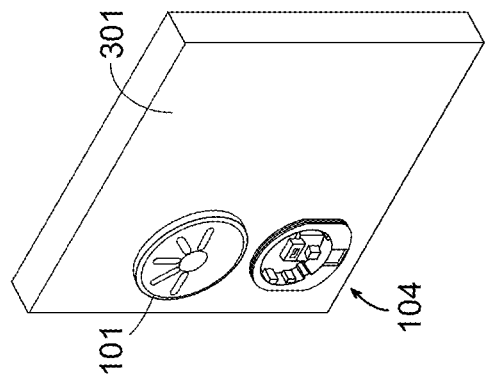
FIG. 3B
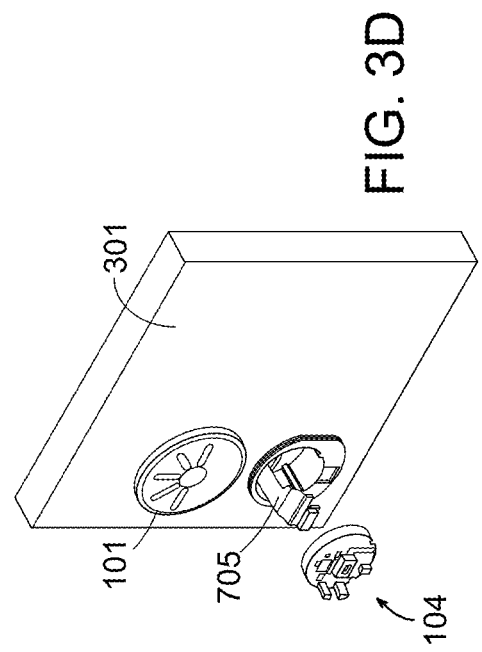
FIG. 3D
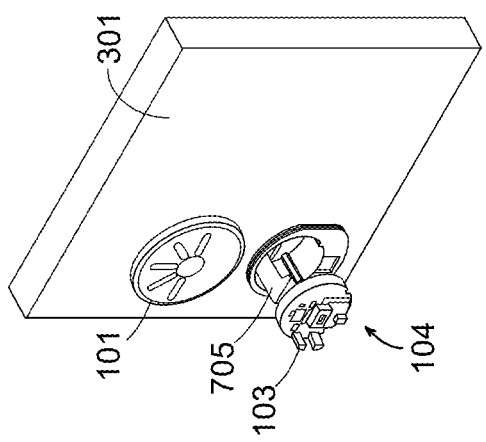
FIG. 3C
FIG. 3A

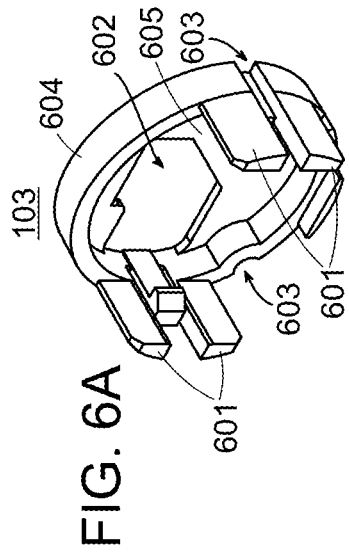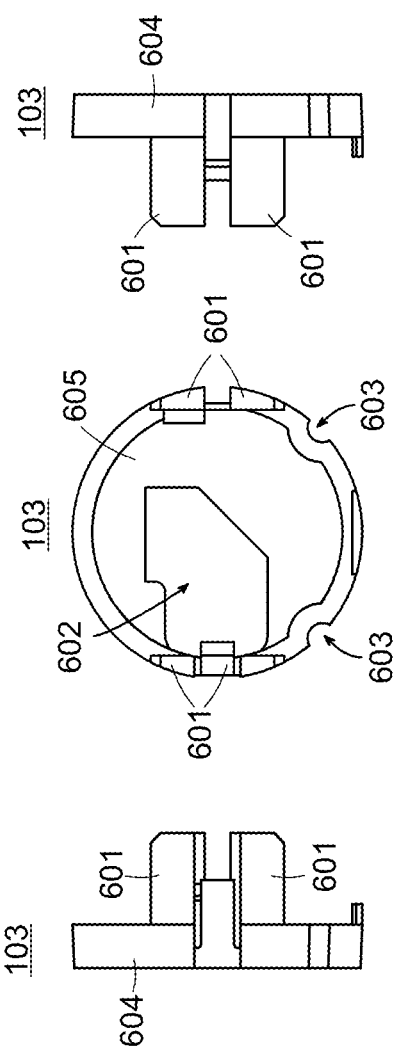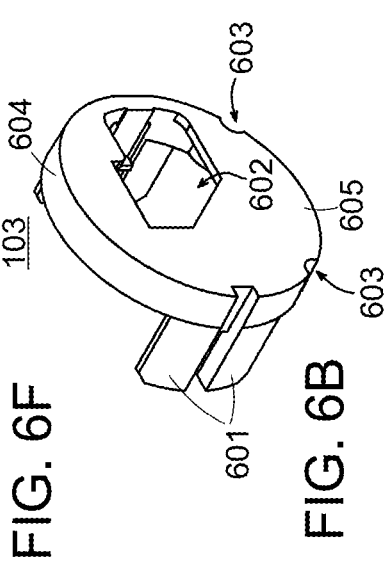

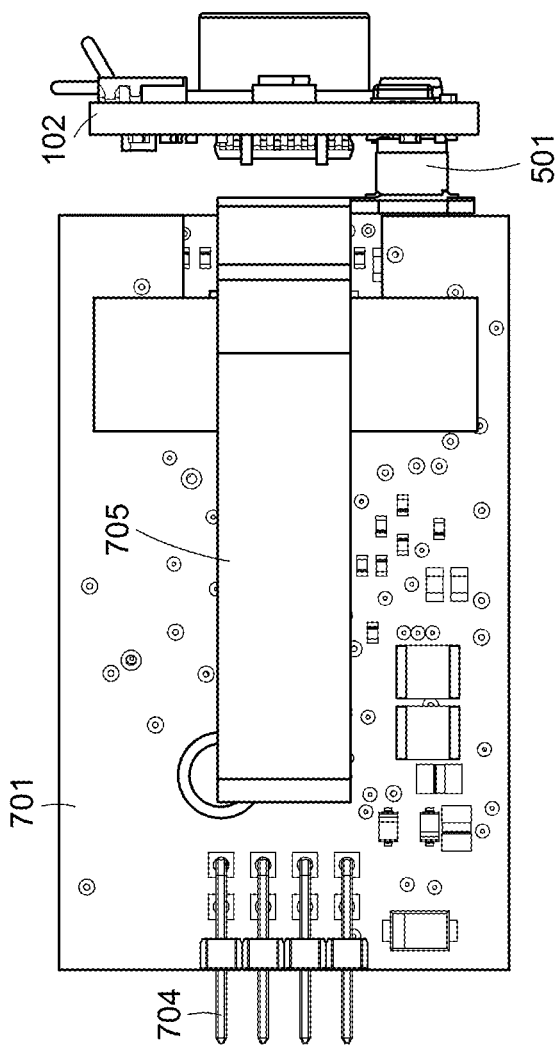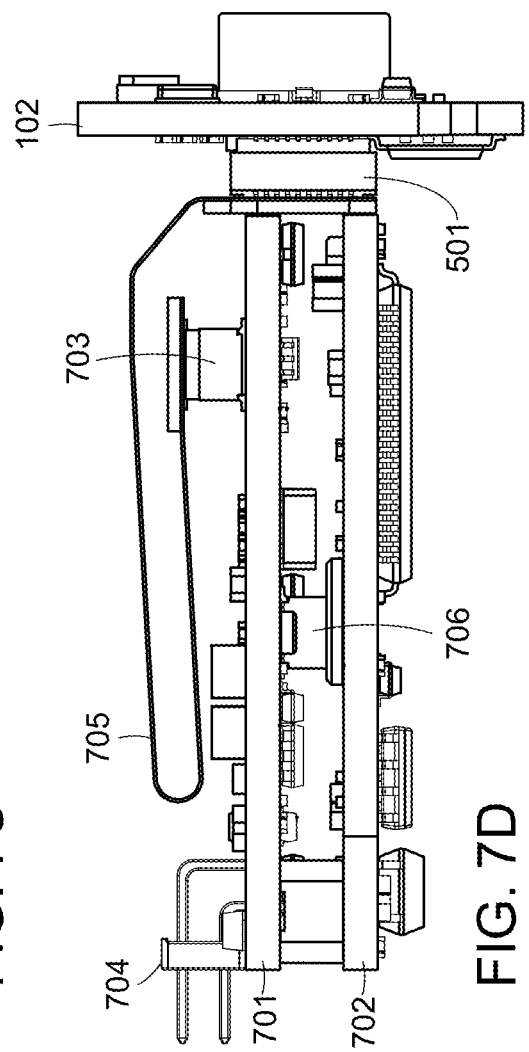
FIG. 7C
FIG. 7D

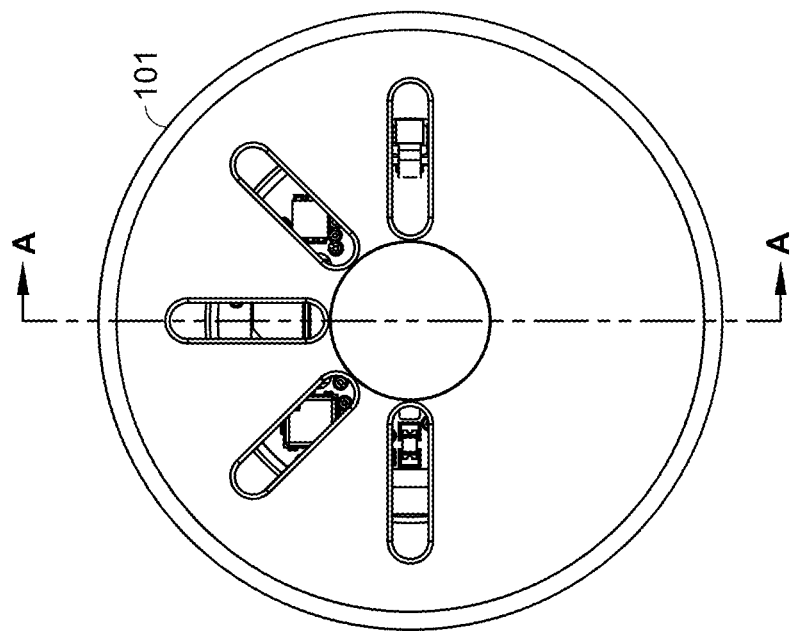
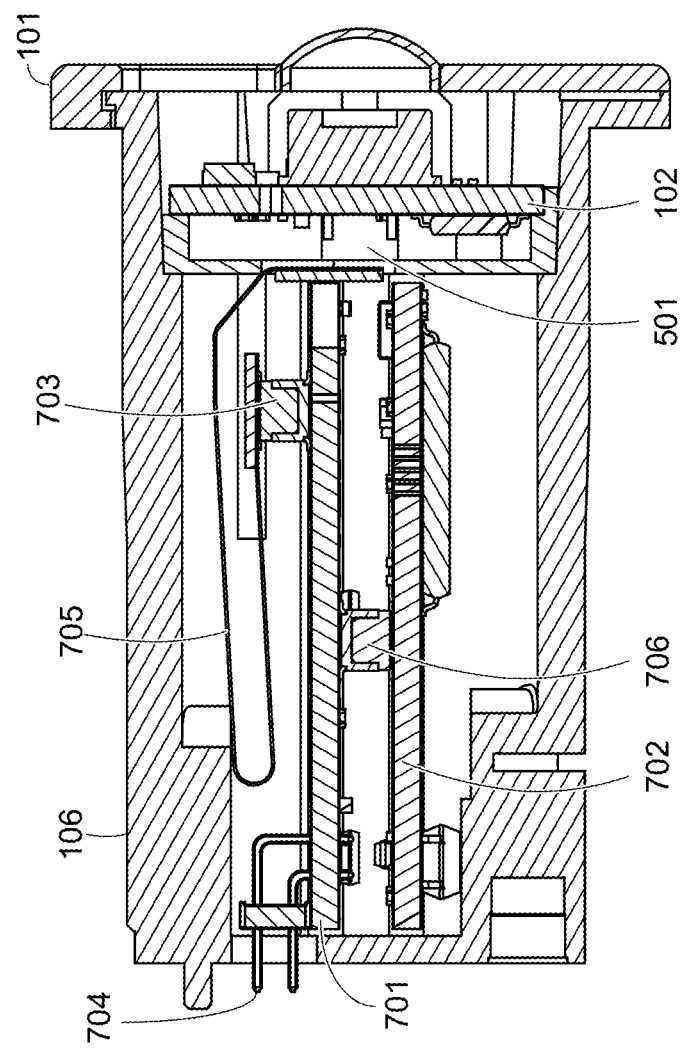
FIG. 7E
SECTION A-A
SCALE 4:1

SECTION D-D
SCALE 4:1

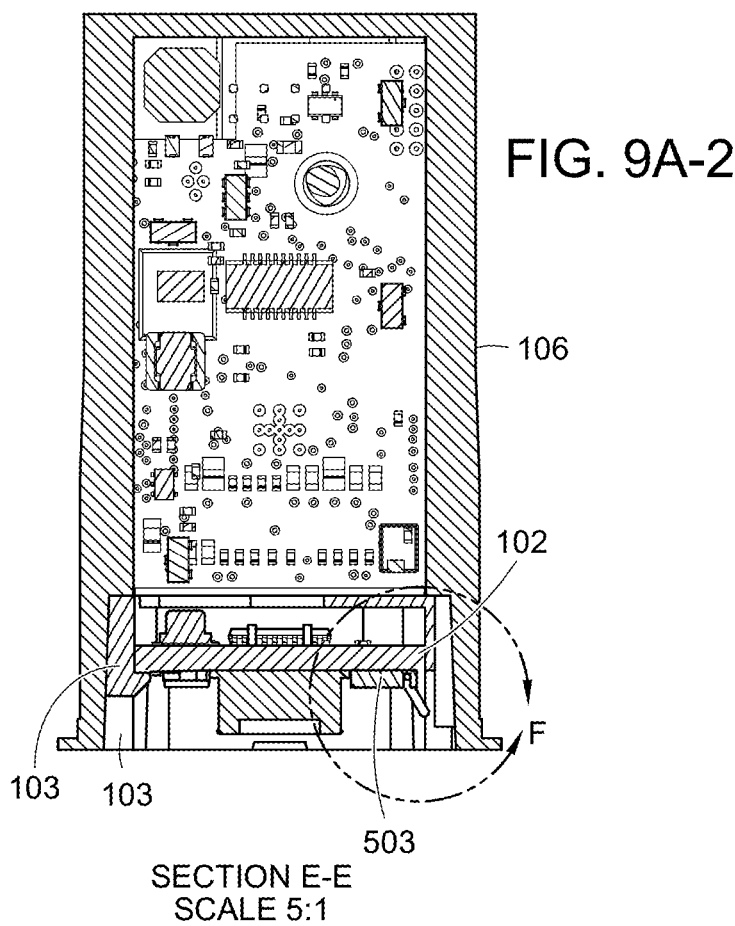
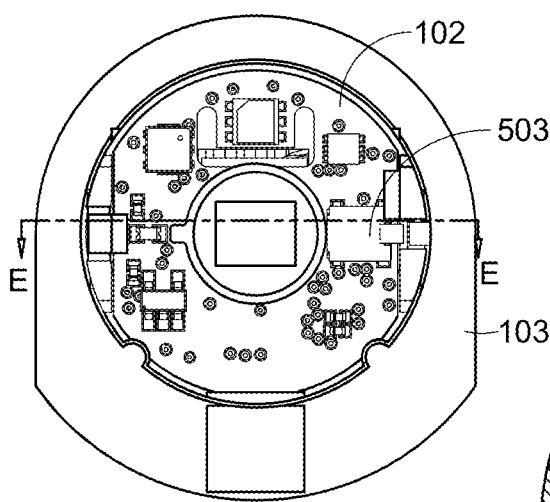
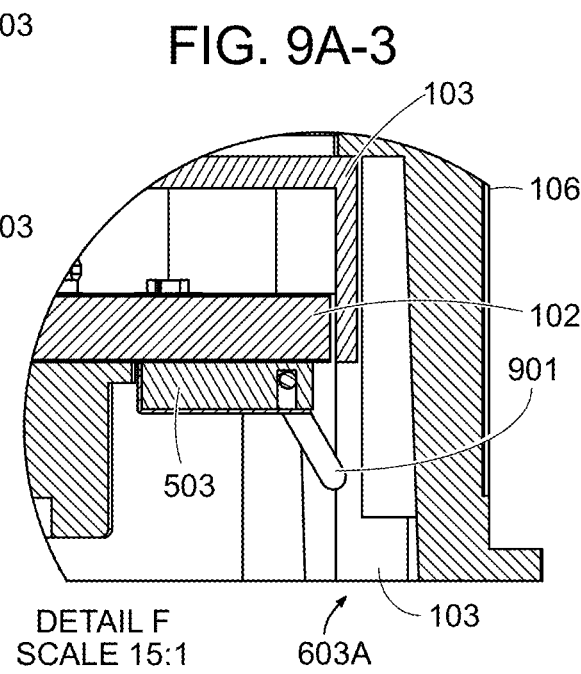

SECTION B-B
SCALE 5:1

DETAILS C
SCALE 15:1

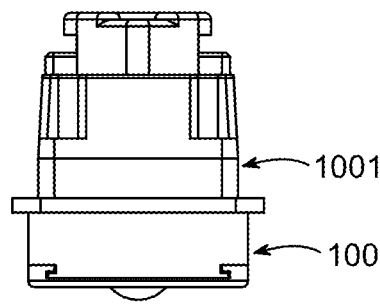
FIG. 10G
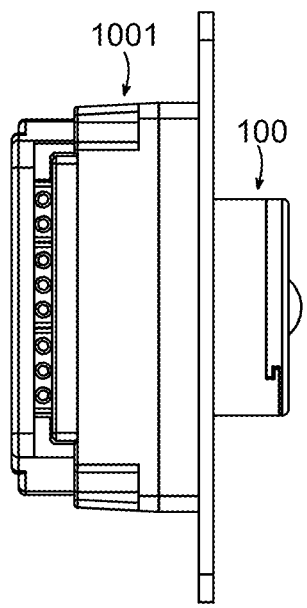
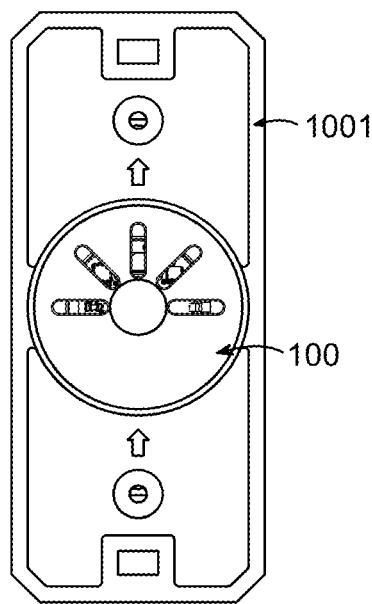
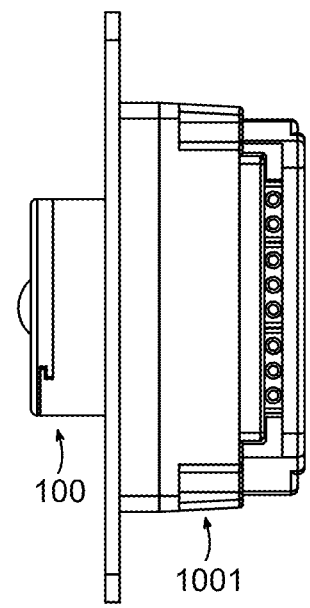
FIG. 10D     FIG. 10C     FIG. 10E
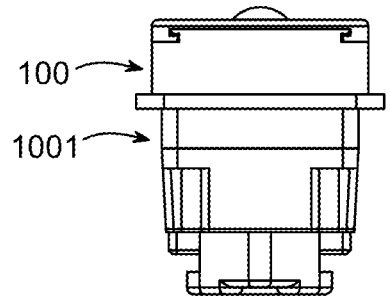
FIG. 10H

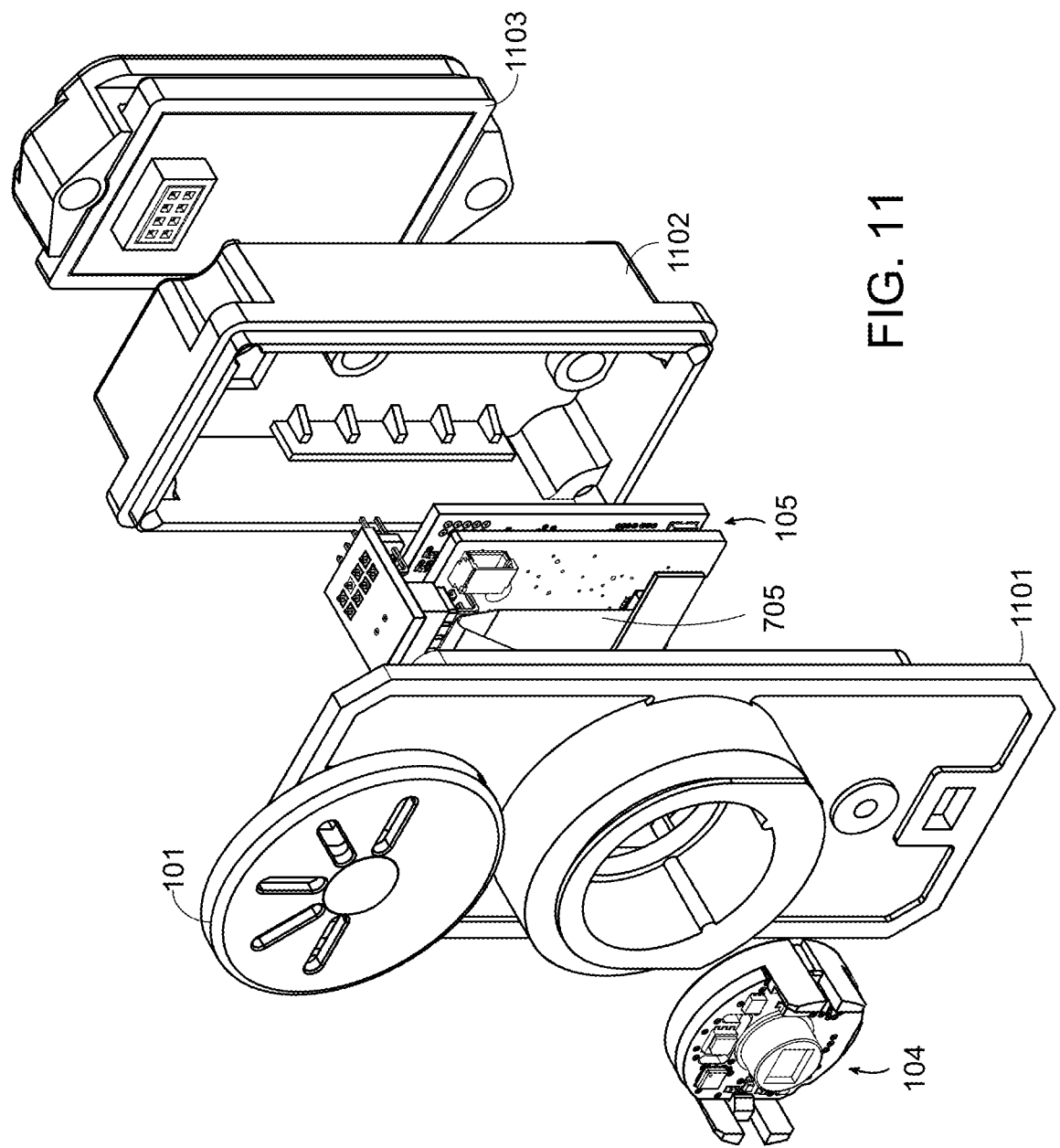

SECTION A-A
SCALE 3:1

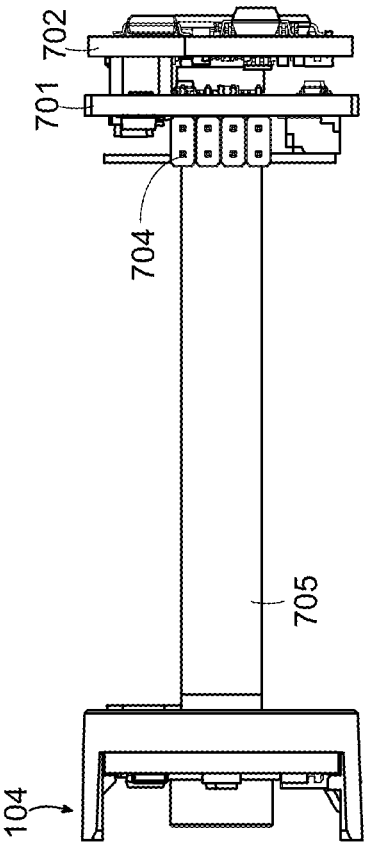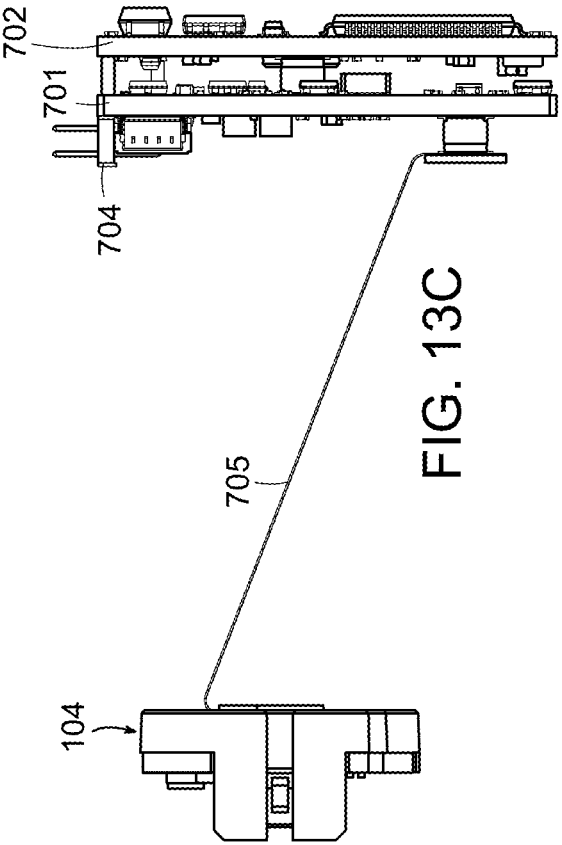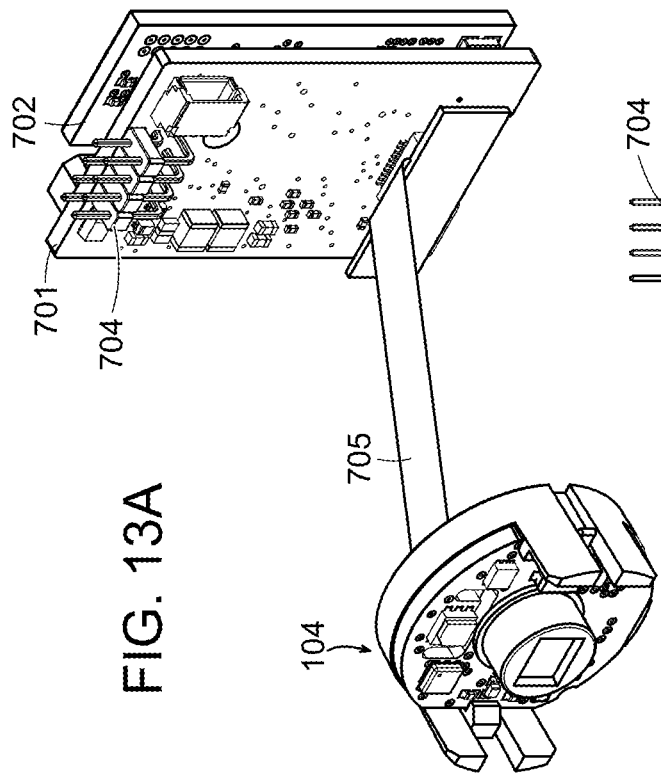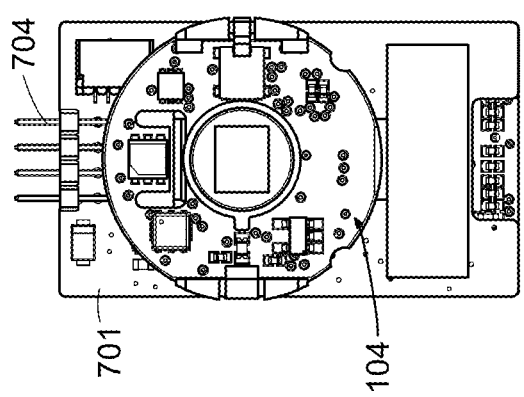

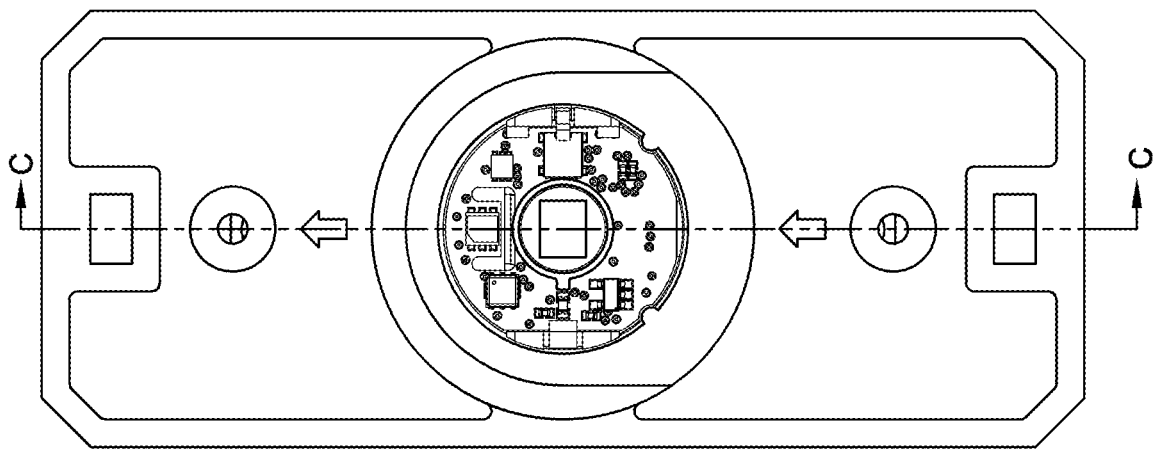
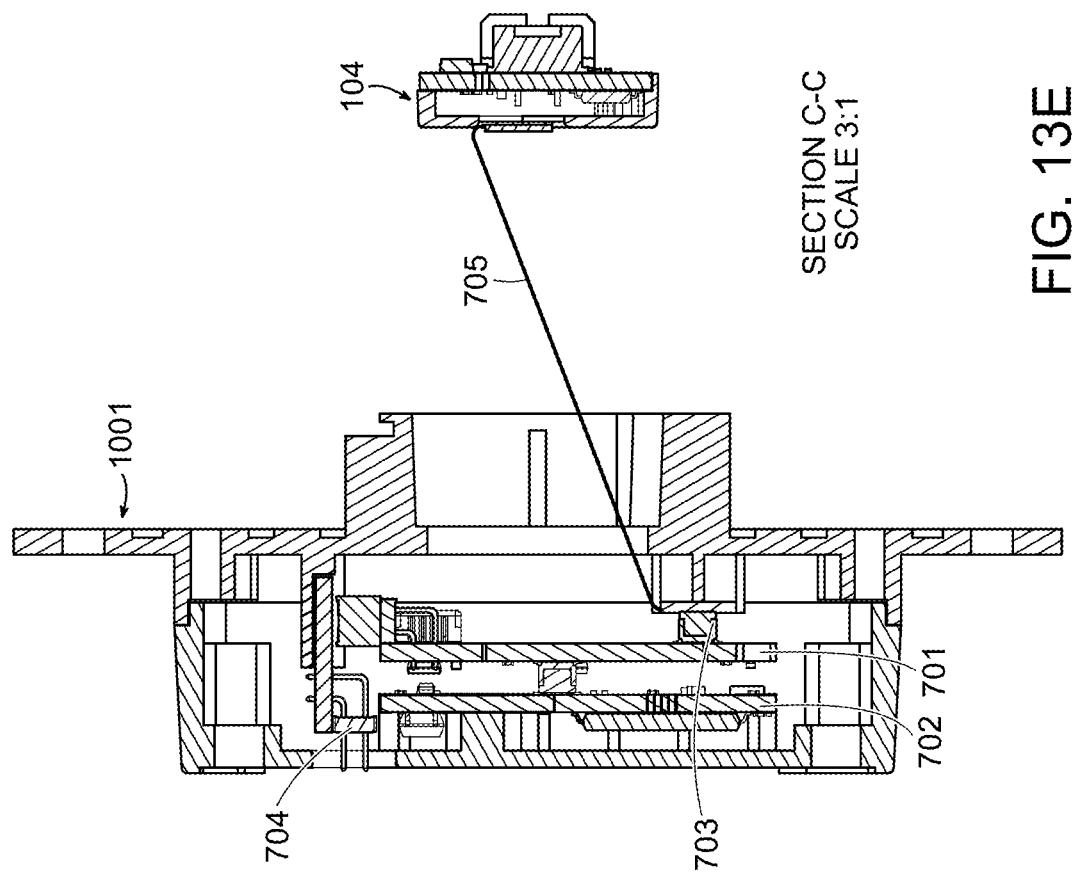
FIG. 13E

SMART BUILDING SENSING DEVICE WITH FIELD REPLACEABLE SENSORS

CROSS-REFERENCE TO RELATED APPLICATIONS

The present application claims priority to U.S. Provisional Patent Application Ser. No. 63/275,570, entitled "Autonomous Buildings" and filed Nov. 4, 2021. The foregoing application is incorporated herein by reference in its entirety.

TECHNICAL FIELD

The present invention relates to sensors in buildings, and more particularly to field replaceable sensors in buildings.

BACKGROUND ART

The key to any smart building solution is the capability to measure, assess, and monitor the building's environment and to track what is happening inside and outside of the building. This data, which is obtained by sensors, is digitized so that it can be consumed by the software algorithms that operate and automate the building. Measurements may include temperature and humidity, but many other factors can be sensed as well, including air quality, lighting levels, motion, human presence, water flow, air flow, thermal patterns, sound levels, and so on. Further, sensing technology is rapidly changing, and new types of sensors are constantly being introduced into the market. The needs of the building owners, operators, and/or occupants also change over time. For example, prior to the recent pandemic, the ability to monitor air flow and air quality was not as important as it is now. However, conventional sensors are often hardwired to the building infrastructure, making their replacement difficult and time consuming. Expertise in handling the building's wiring and infrastructure is often required. This unnecessarily increases the difficulty and costs of upgrading sensors.

SUMMARY OF THE EMBODIMENTS

The foregoing features of embodiments will be more readily understood by reference to the following detailed description, taken with reference to the accompanying drawings. Embodiments of the present invention can be freely combined with each other if they are not mutually exclusive.

Embodiments of the present invention, a sensing device is configured with sensors that are removable and replaceable in the field from a wall or utility box in a building, without the need to configure or modify any wirings or other building infrastructure. A sensing device with field replaceable sensors provides a practical way to enable sensors to be replaced for repair, to install new sensors as they are introduced to the market, or to change the sensors to meet changes in user needs or building use cases.

According to one embodiment, a sensing device includes an enclosure, a sensor assembly that includes a plurality of sensors, a printed circuit board (PCB) assembly, and a flexible jumper. The flexible jumper includes a first end and a second end opposite to the first end. The first end of the flexible jumper is coupled to the sensor assembly, and the second end of the flexible jumper is coupled to the PCB assembly. The sensor assembly, the PCB assembly, and the flexible jumper are configured to reside within the enclosure. The sensor assembly is configured to be decoupled from the first end of the flexible jumper and removed from the enclosure without decoupling the second end of the flexible jumper from the PCB assembly and without removing the PCB assembly from the enclosure.

In one aspect of the first embodiment, the sensor assembly includes a sensor PCB that includes the plurality of sensors and a carrier coupled to the sensor PCB and configured to engage the enclosure when the sensor assembly resides within the enclosure.

In another aspect of the first embodiment, the sensor assembly includes a sensor PCB. The sensor PCB includes the plurality of sensors and a microswitch. A coupling of the sensor assembly to the enclosure causes the microswitch to automatically toggle to an on position, and power is supplied to the sensing device. A decoupling of the sensor assembly from the enclosure causes the microswitch to automatically toggle to an off position, and power to the sensing device is turned off.

In another aspect of the first embodiment, the sensing device further includes a sensing device cover coupled to a front end of the enclosure. The flexible jumper is configured to exert an outward pressure on the sensor assembly when the sensor assembly is engaged with the enclosure. When the sensing device cover is decoupled from the front end of the enclosure, the pressure exerted by the flexible jumper pushes the sensor assembly away from the enclosure.

In another aspect of the first embodiment, the PCB assembly includes a power supply PCB and a microcontroller unit (MCU) PCB coupled to the power supply PCB.

In another aspect of the first embodiment, the sensing device further includes an input-output (IO) module coupled to the power supply PCB and to a building infrastructure.

In another aspect of the first embodiment, a second sensor assembly includes a second plurality of sensors. The second sensor assembly is configured to be coupled to the first end of the flexible jumper after the sensor assembly is decoupled from the first end of the flexibly jumper. The second sensor assembly includes a read-only chip that contains a description of the second plurality of sensors. When the second sensor assembly is coupled to the first end of the flexible jumper, a microcontroller on the PCB assembly reads the description on the read-only chip.

According to a second embodiment, a method for replacing sensors in the field includes decoupling a first sensor assembly of a sensing device from an enclosure. The first sensor assembly includes a first plurality of sensors. The first sensor assembly is coupled to a first end of a flexible jumper, and a second end of the flexible jumper is coupled to a printed circuit board (PCB) assembly residing within the enclosure. The first sensor assembly is pulled away from the enclosure, and the first end of the flexible jumper is detached from the first sensor assembly, without detaching the second end of the flexibly jumper from the PCB assembly and without removing the PCB assembly from the enclosure. A second sensor assembly, which includes a second plurality of sensors, is then attached to the first end of the flexible jumper. The second sensor assembly is then coupled to the enclosure.

In one aspect of the second embodiment, the first sensor assembly includes a sensor PCB that includes the first plurality of sensors and a carrier coupled to the sensor PCB and configured to engage the enclosure when the first sensor assembly resides within the enclosure.

In another aspect of the second embodiment, the first sensor assembly includes a first sensor PCB. The first sensor PCB includes the first plurality of sensors and a first microswitch. The decoupling of the first sensor assembly from the enclosure causes the first microswitch to automatically toggle to an off position, and power to the sensing device is turned off.

In another aspect of the second embodiment, the second sensor assembly includes a second sensor PCB, the second sensor PCB includes the second plurality of sensors and a second microswitch. The coupling of the second sensor assembly to the enclosure causes the second microswitch to automatically toggle to an on position, and power is supplied to the sensing device.

BRIEF DESCRIPTION OF THE DRAWINGS

FIGS. 1A-1D illustrate a front top perspective view, a front bottom perspective view, a back top perspective view, and a back bottom perspective view, respectively, of a sensing device with field replaceable sensors according to some embodiments.

FIGS. 1E-1J illustrate a front view, a left side view, a right side view, a back view, a top view, and a bottom view, respectively, of the sensing device with field replaceable sensors according to some embodiments.

FIGS. 3A-3D illustrate the replacement of the sensor assembly in the sensing device installed in a wall, according to some embodiments.

FIGS. 6A-6H illustrate the sensor PCB carrier in more detail.

FIGS. 7A-7E illustrate the sensing device with the sensor assembly in an installed position.

FIGS. 9A-1 through 9B-3 illustrate in more detail the microswitch of the sensor PCB.

FIGS. 10A-10H illustrate the sensing device with field replaceable sensors in a J-box according to one alternative embodiment.

FIG. 11 illustrates an exploded view of the sensing device with field replaceable sensors in a J-box.

FIGS. 13A-13E illustrate the sensing device with field replaceable sensors during removal of the sensor assembly from a J-box.

DETAILED DESCRIPTION OF SPECIFIC EMBODIMENTS

Figure 2:
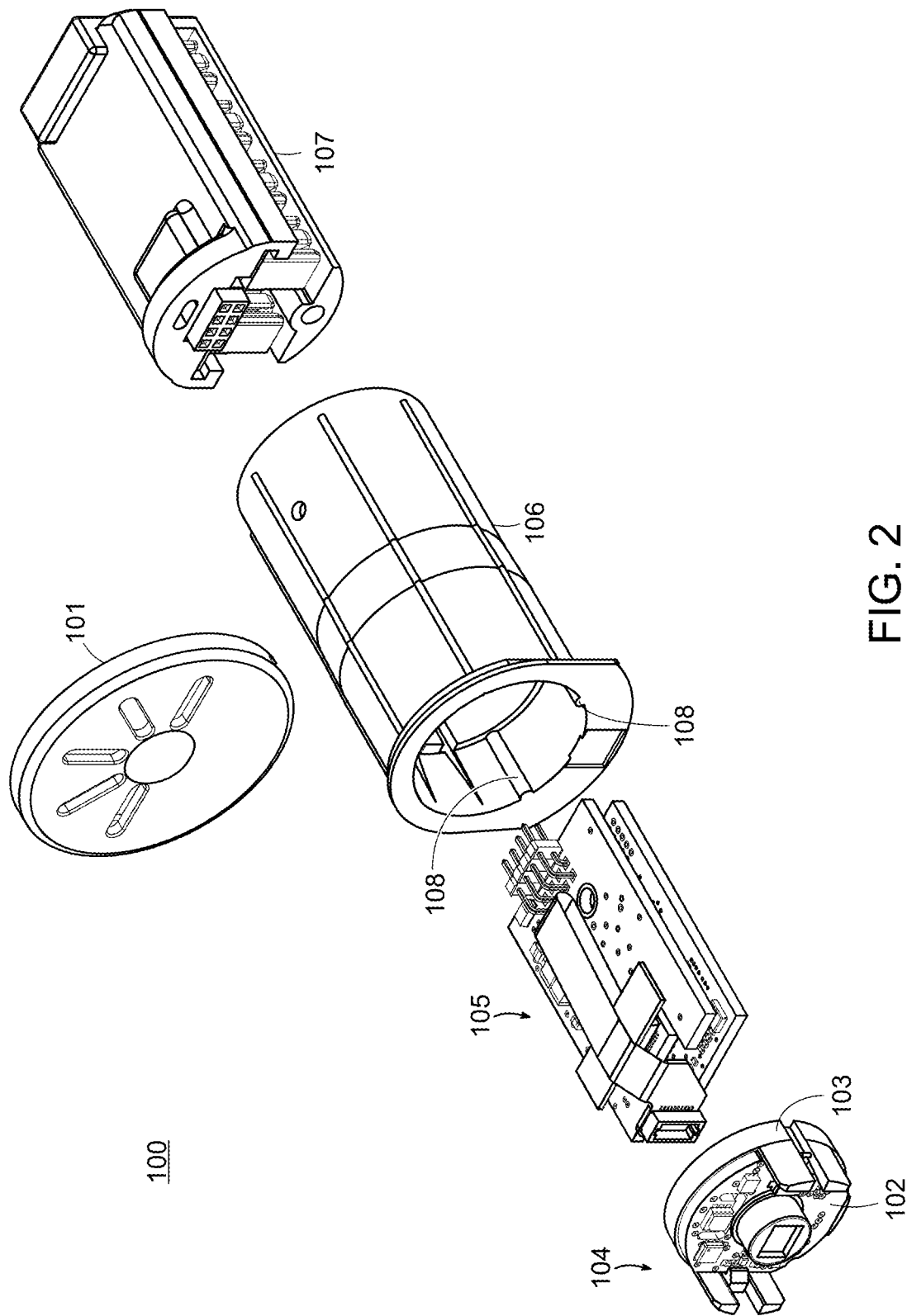
FIG. 2 illustrates an exploded view of the sensing device with field replaceable sensors according to some embodiments.

Reference in this specification to "one embodiment," "an embodiment," "an exemplary embodiment," "some embodiments," or "a preferred embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments. In general, features described in one embodiment might be suitable for use in other embodiments as would be apparent to those skilled in the art.

THE FIGURES USE THE FOLLOWING REFERENCE NUMERALS

100 Sensing device with field replaceable sensors
101 Sensing device cover
102 Sensor printed circuit board (PCB)
103 Sensor PCB carrier
104 Sensor assembly
105 PCB assembly
106 Main enclosure
107 Input-Output (IO) module
108 Protrusions in main enclosure 106
301 In-wall flush mount
302 Enclosure flush-mount bezel
501 Connector between sensor PCB 102 and flexible jumper 705
502 Sensors on sensor PCB 102
503 Microswitch on sensor PCB 102
601 Prongs on sensor PCB carrier 103
602 Opening in sensor PCB carrier 103
603 Slots in sensor PCB carrier 103
603A Particular slot of the indentions 603
604 Frame of the sensor PCB carrier 103
605 Plate of the sensor PCB carrier 103
701 Power supply PCB in PCB assembly 105
702 MCU PCB in PCB assembly 105
703 Connector between flexible jumper and power supply PCB 701
704 Connector to IO module 107
706 Connection between power supply PCB 701 and MCU PCB 702
705 Flexible jumper
901 Lever on microswitch 503
1001 J-box
1101 Front enclosure of J-box 1101
1102 Rear enclosure of J-box 1101
1103 IO module coupled to J-box 1101

Embodiments of the present invention provide a sensing device with field replaceable sensors. The sensors of the sensing device are configured to be removable and replaceable from a wall or utility box in a building, without the need to configure or modify any wirings or other building infrastructure. The sensing device with field replaceable sensors provides a practical way to enable sensors to be replaced for repair, to install new sensors as they are introduced to the market, or to change the sensors to meet changes in user needs or building use cases.

FIGS. 1A-1D illustrate a front top perspective view, a front bottom perspective view, a back top perspective view, and a back bottom perspective view, respectively, of a sensing device with field replaceable sensors according to some embodiments. FIGS. 1E-1J illustrate a front view, a left side view, a right side view, a back view, a top view, and a bottom view, respectively, of the sensing device with field replaceable sensors according to some embodiments. FIG. 2 illustrates an exploded view of the sensing device with field replaceable sensors according to some embodiments. The sensing device with field replaceable sensors 100 includes a sensor printed circuit board (PCB) 102 coupled to a sensor PCB carrier 103, forming a sensor assembly 104. The sensor assembly 104 is coupled to a PCB assembly 105. The PCB assembly 105 includes a plurality of PCB's and connectors for interfacing with the sensor PCB 102, as described further below. The sensor assembly 104 and the PCB assembly 105 reside within a main enclosure 106. The PCB assembly 105 is further coupled to an input-output (IO) module 107. The IO module 107 functions as an interface between the PCB assembly 105 and the building infrastructure. The sensor assembly 104, the PCB assembly 105, the main enclosure 106, and the IO module 107, when fully installed, reside within a wall or utility box. A sensing device cover 101 can be coupled to a front end of the main enclosure 106 to protect the sensor assembly 104.

Figures 2, 9B:
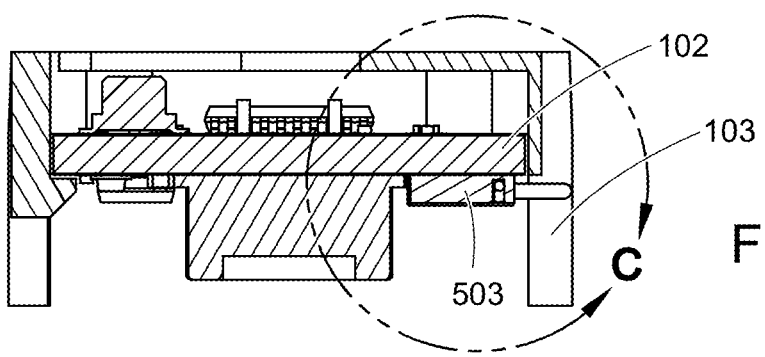
Figures 1, 9B:
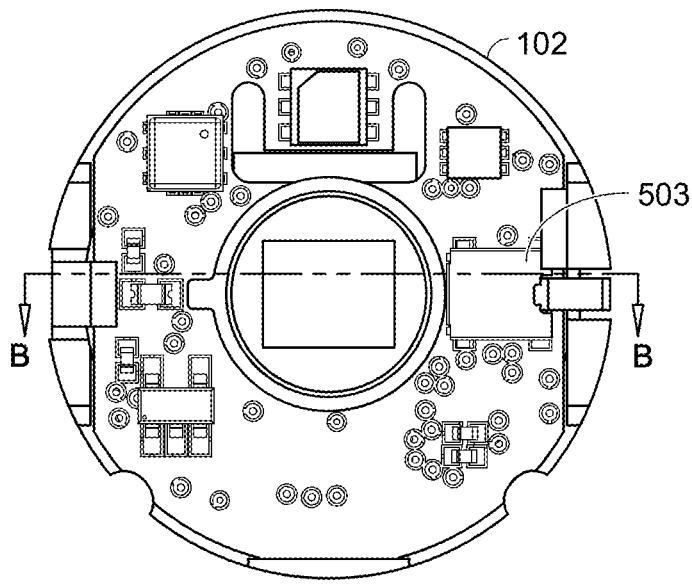
Figures 3, 9B:
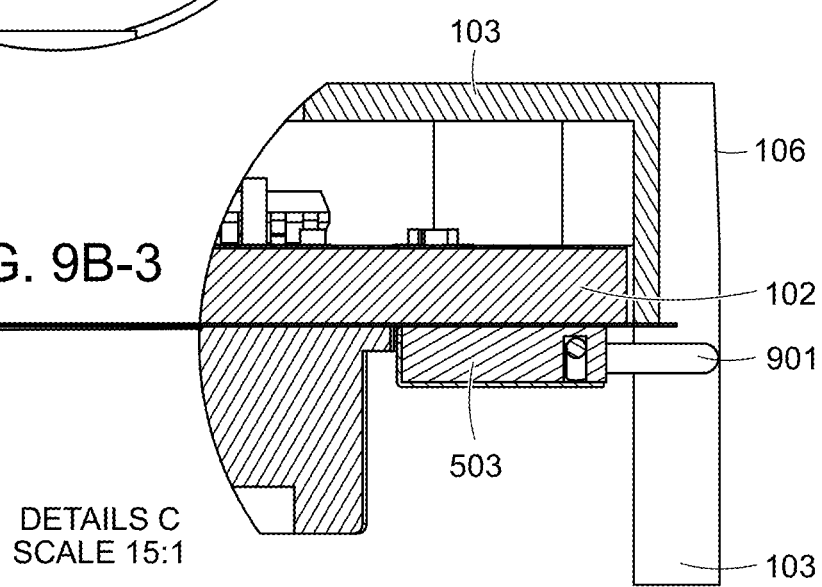

FIGS. 3A-3D illustrate the replacement of the sensor assembly 104 in the sensing device 100 installed in a wall, according to some embodiments. As illustrated in FIG. 3A, the sensing device with field replaceable sensors 100 is installed in an in-wall flush mount 301. As illustrated in FIG. 3B, the sensing device cover 101 is removed. In this example, the sensing device cover 101 slides up and off to reveal the sensor assembly 104. As illustrated in FIG. 3C, when the sensing device cover 101 is removed, the sensor assembly 104 pops forward and away from the main enclosure 106 due to outward pressure exerted by a flexible jumper 705. The removal of the sensor assembly 104 causes a microswitch mounted on the sensor PCB 102 to open a circuit to a power supply, cutting power to the sensing device with field replaceable sensors 100. The microswitch is described further below with reference to FIGS. 9A-1 through 9B-3. The flexible jumper 705 couples to the PCB assembly 105 (not visible), as described further below with reference to FIGS. 7A-7E. The sensor assembly 104 can then be pulled out of the main enclosure 106 (not visible) by grabbing the sensor PCB carrier 103. As illustrated in FIG. 3D, the sensor assembly 104 is then disconnected from the flexible jumper 705, and which in turn disconnects the sensor assembly 104 from the PCB assembly 105. A new sensor assembly 104 can then be connected to the flexible jumper 705 and pushed back into the main enclosure 106. This causes the microswitch mounted on the sensor PCB 102 to close the circuit to the power supply, supplying power to the sensing device 100. The replacement concludes by sliding the sensing device cover 101 back into place.

Figure 4A:
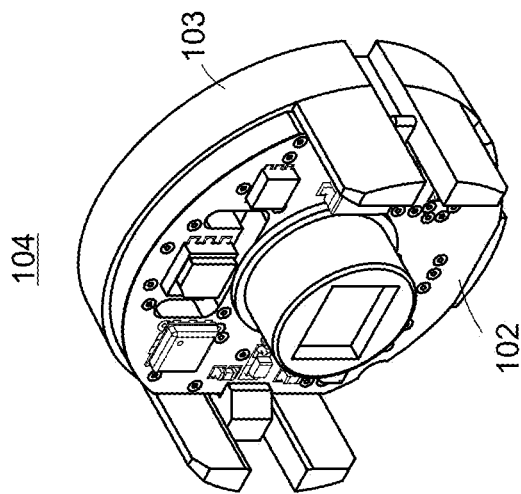
FIGS. 4A-4J illustrate the sensor assembly in more detail.
Figure 4F:
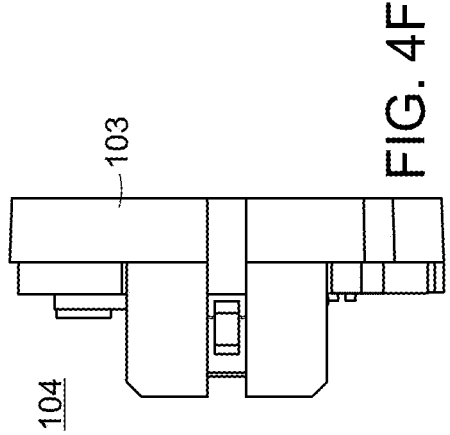
Figure 4G:
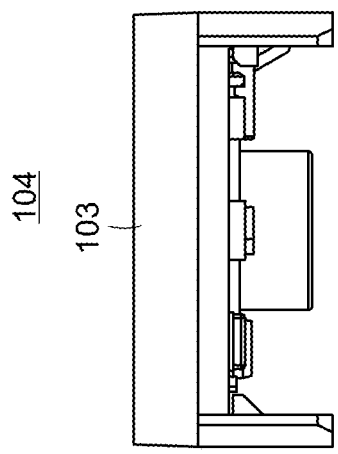
Figure 4D:
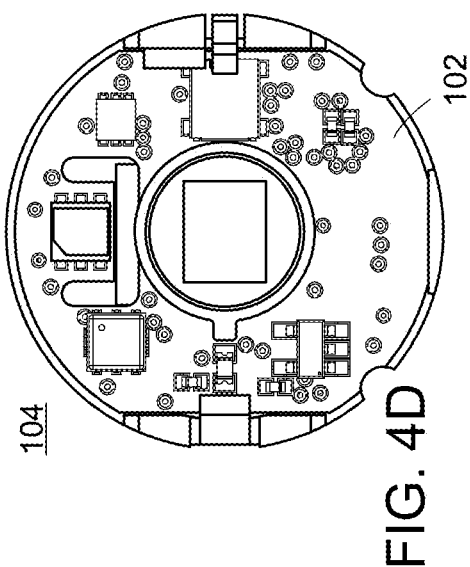
Figure 4B:
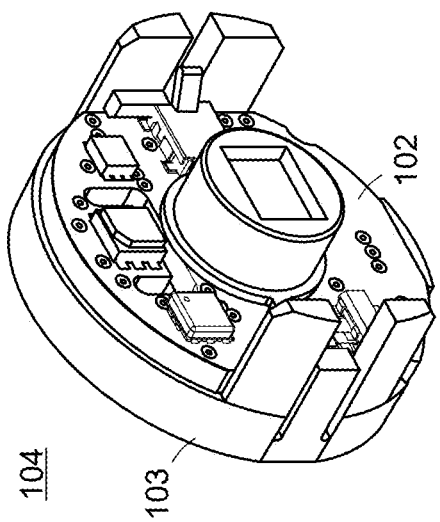
Figure 4E:
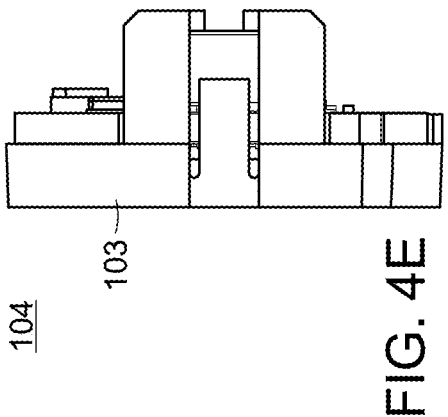
Figure 4J:
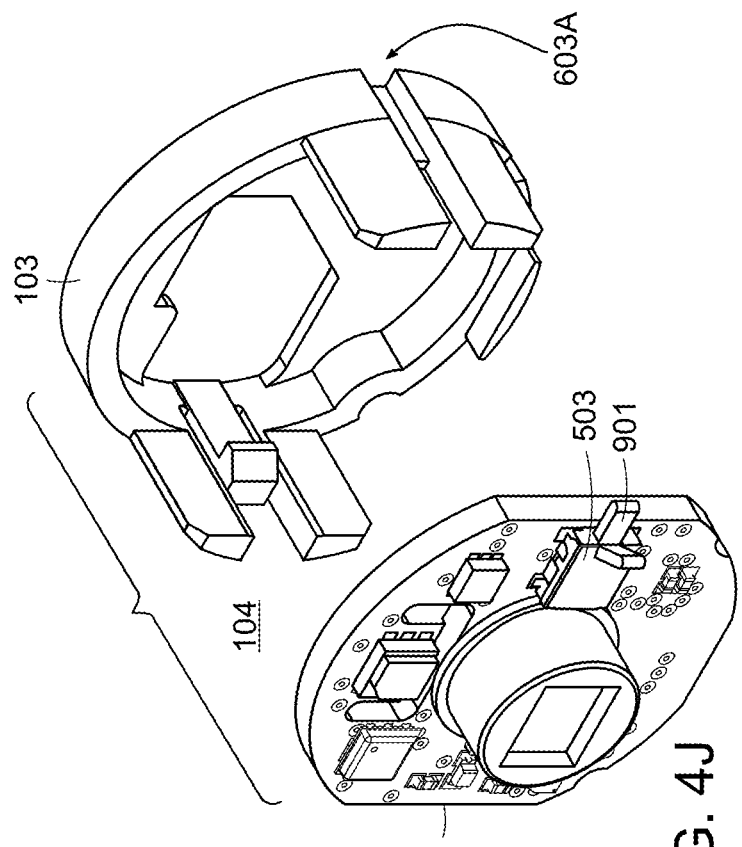
Figure 4H:
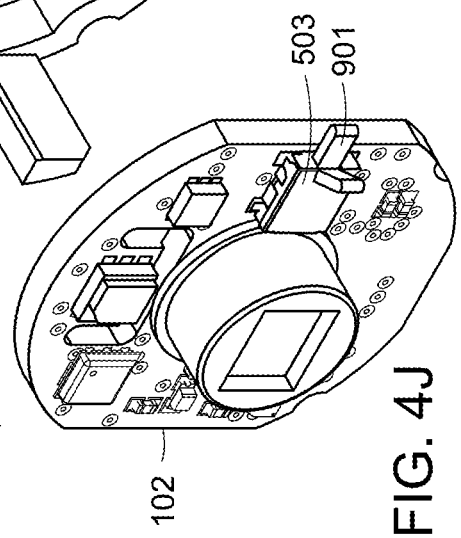
Figure 4C:
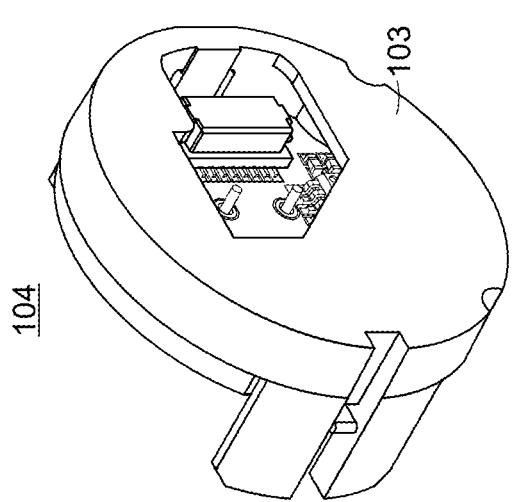
Figure 4I:
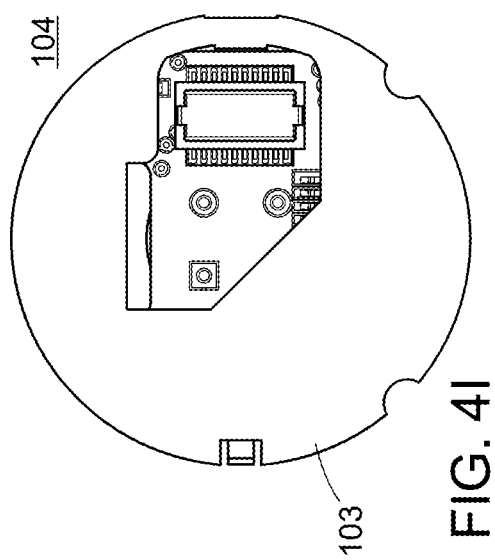
Figure 5A:
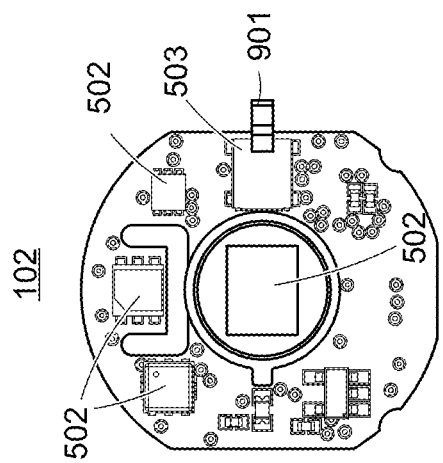
FIGS. 5A-5F illustrate the sensor PCB in more detail.
Figure 5B:
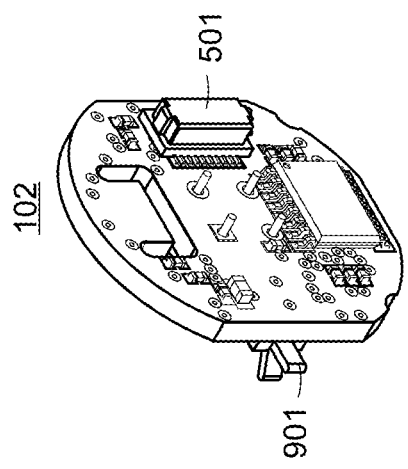
Figure 5C:
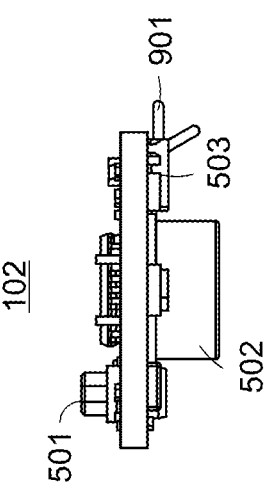
Figure 5D:
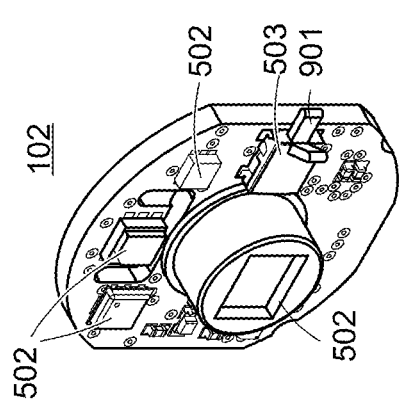
Figure 5E:
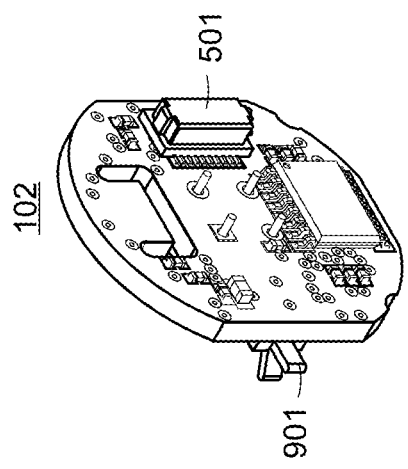
Figure 5F:
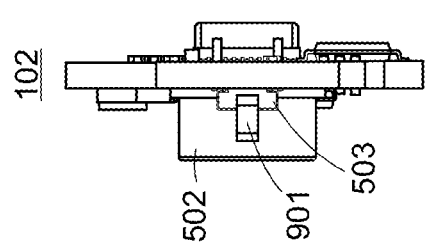

FIGS. 4A-4J illustrate the sensor assembly 104 in more detail. FIGS. 4A-4C illustrate a front right perspective view, a front left perspective view, and a back perspective view, respectively, of the sensor assembly 104. FIGS. 4D-4H illustrate a front view, a left side view, a side right view, a top view, a bottom view, and a back view, respectively, of the sensor assembly 104. FIG. 4J illustrates an exploded view of the sensor assembly 104. The sensor PCB 102 couples to the sensor PCB carrier 103. The sensor PCB carrier 103 allows a user to handle the sensor PCB 102 without needing to touch the sensor PCB 102 directly. Although illustrated as separate components, the sensor PCB carrier 103 may be integrated with the sensor PCB 102. Alternatively, no carrier is used, and instead, various features of the carrier 103 are designed as part of the sensor PCB 102. When a sensor PCB 102 is to be replaced, the entirety of the sensor assembly 104 is replaced.

FIGS. 5A-5F illustrate the sensor PCB 102 in more detail. FIGS. 5A-5F illustrate a front perspective view, a back perspective view, a front view, a right side view, a back view, and a top view, respectively, of the sensor PCB 102. The sensor PCB 102 includes a connector 501. The connector 501 is configured to couple to a first end of a flexible jumper (not shown), where the second end of the flexible jumper connects to the power supply PCB (not shown). The sensor PCB 102 further includes a plurality of sensors 502. The plurality of sensors is configured according to the functions required for user needs or building use cases. Example sensors include, but are not limited to, motion proximity sensors, air quality sensors, temperature and humidity sensors, and ambient light sensors. The sensor PCB 102 further includes a microswitch 503 for automatically cutting and supplying power to the sensing device 100 as the sensor assembly 104 is removed from and inserted into the main enclosure, respectively. The sensor PCB 102 includes a read-only chip that contains a description of the sensors on the sensor PCB 102. In this embodiment, the read-only chip may be factory-programmed. Alternatively, the chip may be field programmable.

FIGS. 6A-6H illustrate the sensor PCB carrier 103 in more detail. FIGS. 6A-6B illustrate a front perspective view and a back perspective view of the sensor PCB carrier 103. FIGS. 6C-6H illustrate a front view, a left side view, a right side view, a back view, a top view, and a bottom view, respectively, of the sensor PCB carrier 103. The sensor PCB carrier 103 includes a circular frame 604 coupled to a plate 605. The frame 604 includes one or more slots 603 for engaging protrusions 108 in the main enclosure (see FIG. 2). In this embodiment, the protrusions 108 are slightly tapered, with the smaller end being more proximate to the end of the main enclosure 106 that engages the sensor assembly 104. The slots 603 and protrusions 108 function as guides to ensure that the sensor assembly 104 is inserted into the main enclosure 108 with the proper orientation. The plate 605 includes an opening 602 through which the connector 501 of the sensor PCB 102 can be accessed. Coupled to the frame 604 and projecting outward from the plate 605 are a plurality of prongs 601. The prongs 601 may be used for grabbing the sensor PCB carrier 103 in order to remove or insert the sensor assembly 104.

Figure 7A:
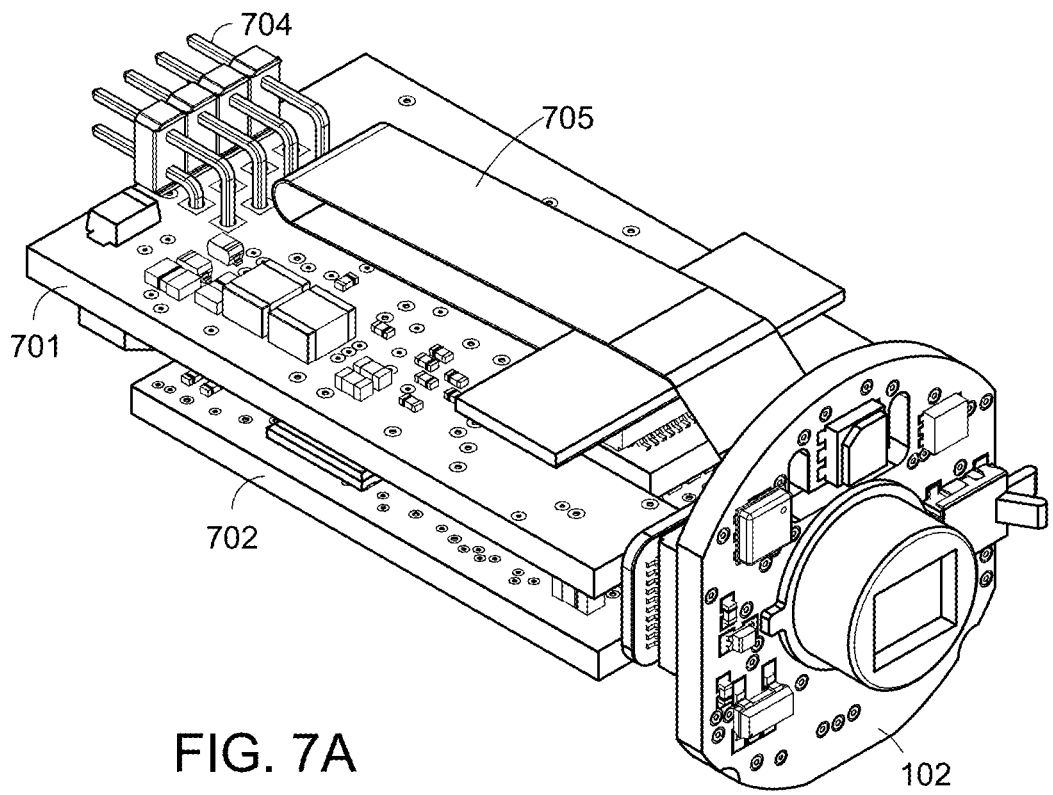
Figure 7B:
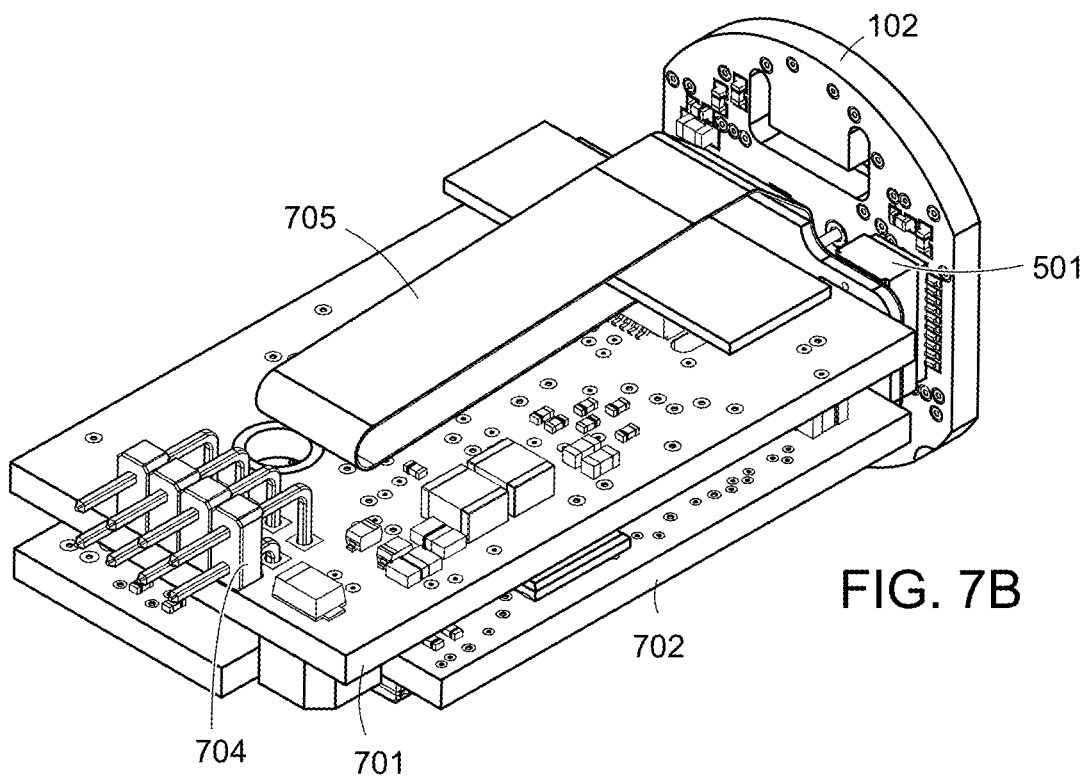

FIGS. 7A-7E illustrate the sensing device with field replaceable sensors 100 in an installed position. FIGS. 7A-7D illustrate a front perspective view, a back perspective view, a top view, and a side view, respectively, of the sensing device 100 with the sensor assembly 104 in an installed position. FIG. 7E illustrates a cross-sectional view of the sensing device with field replaceable sensors 100 along axis A-A as installed in the main enclosure 106. For clarity of illustration, in FIGS. 7A-7D, the sensing device 100 is shown without the sensor PCB carrier 103 and without the main enclosure 106. (See FIG. 3A for the sensing device 100 in an installed position in a wall 301.) When in the installed position, the sensor PCB 102 is coupled to the PCB assembly 105 via a flexible jumper 705. The PCB assembly 105 includes a power supply PCB 701 coupled to a microcontroller unit (MCU) PCB 702 via connector 706. Coupled to the power supply PCB 701 is a connector 704 which connects the PCB assembly 105 to the IO module 107. The connector 501 of the sensor PCB 102 is coupled to a first end of the flexible jumper 705, with the second and opposite end of the flexible jumper 705 coupled to a connector 703 of the power supply PCB 701. The flexible jumper 705 thus physically and electrically connects the sensor PCB 102 to the PCB assembly 105, allowing electronic signals to be exchanged between the sensor PCB 102 and the MCU PCB 702 via the power supply PCB 701. In the installed position, the flexible jumper 705 is folded and resides within the main enclosure 106.

Figure 8A:
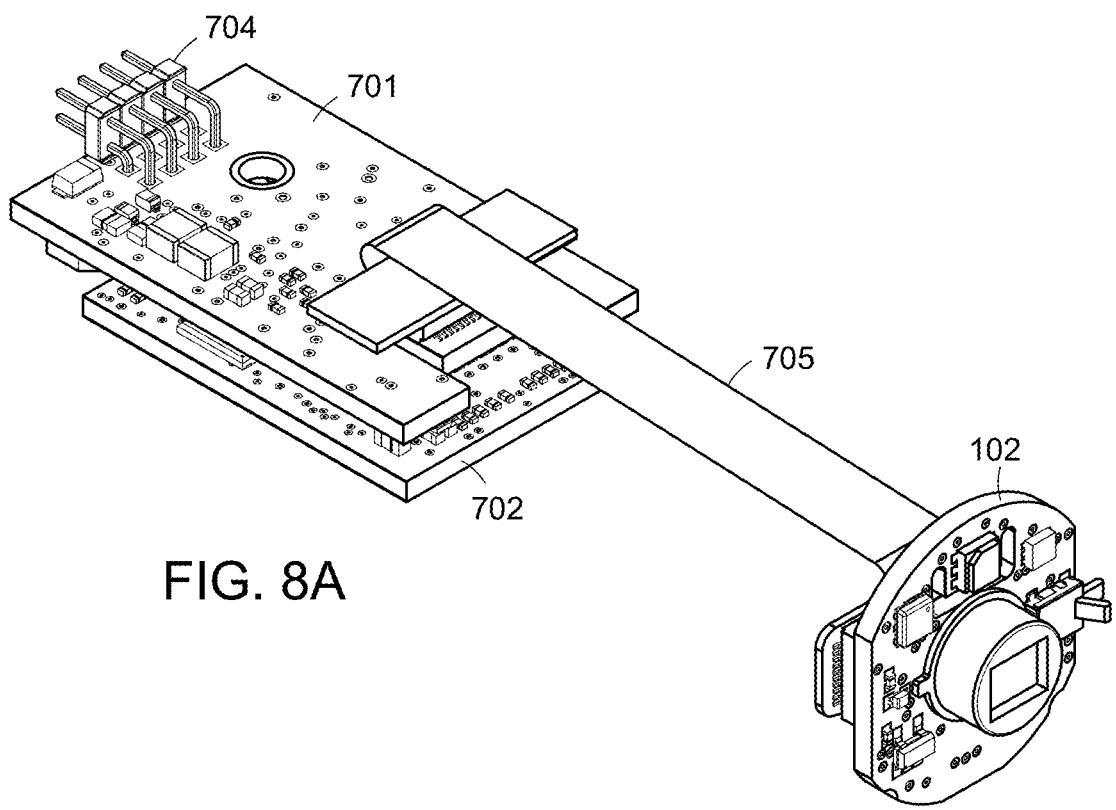
FIGS. 8A-8E illustrate a front perspective view, a back perspective view, a top view, and a side view, and a cross-sectional view, respectively, of the sensing device during the removal of the sensor assembly.
Figure 8B:
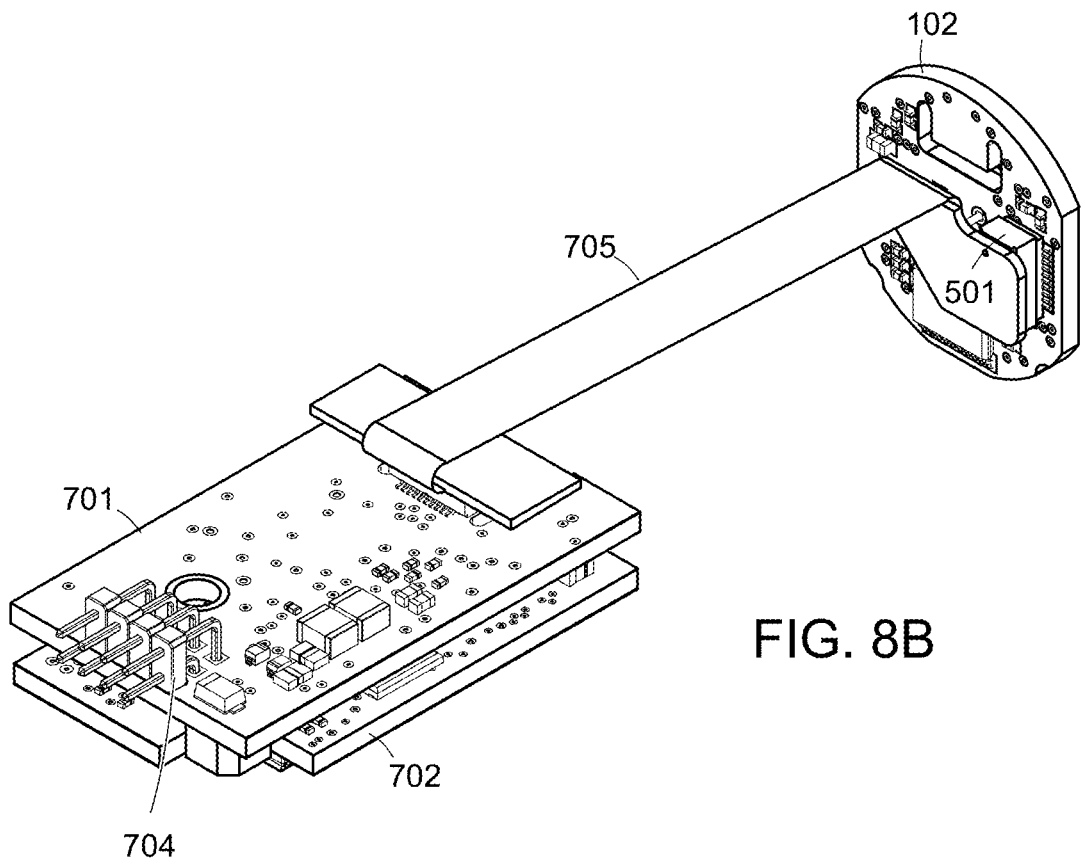
Figure 8C:
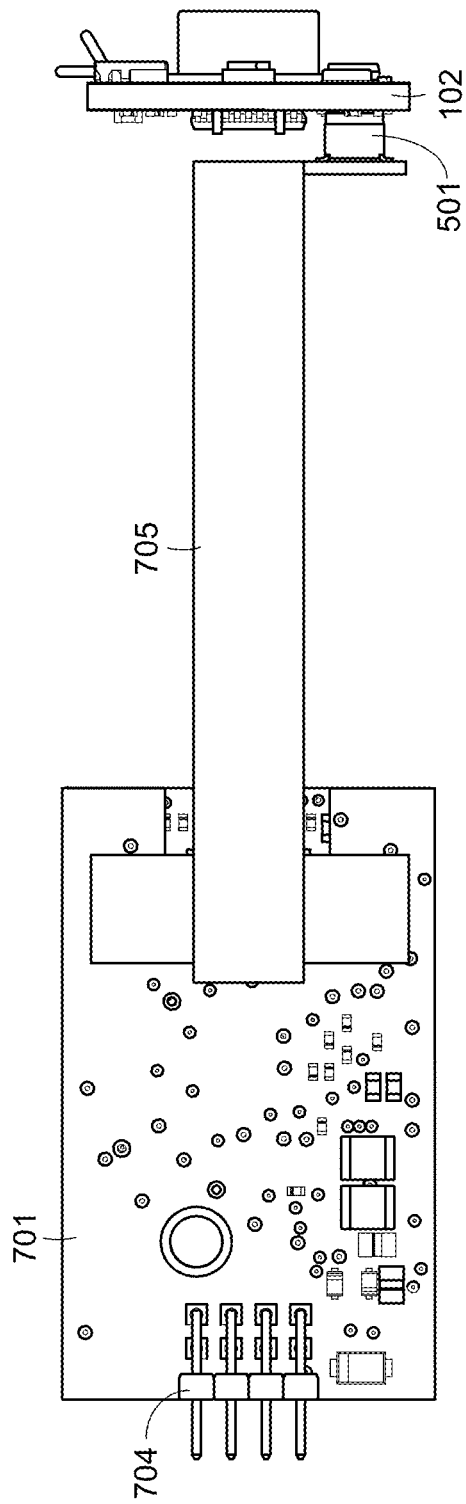
Figure 8D:
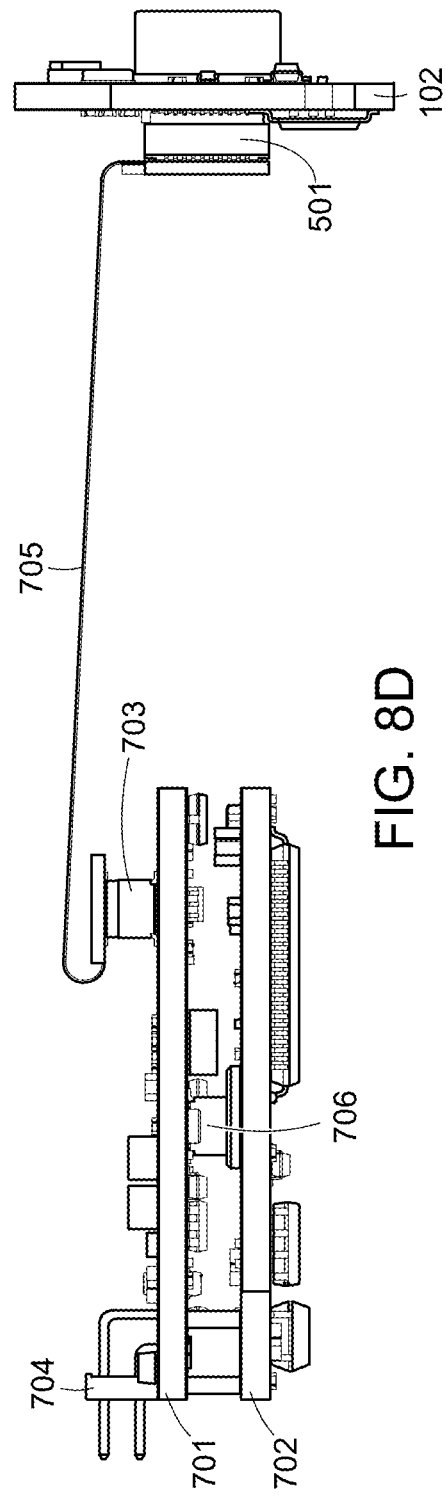
Figure 8E:
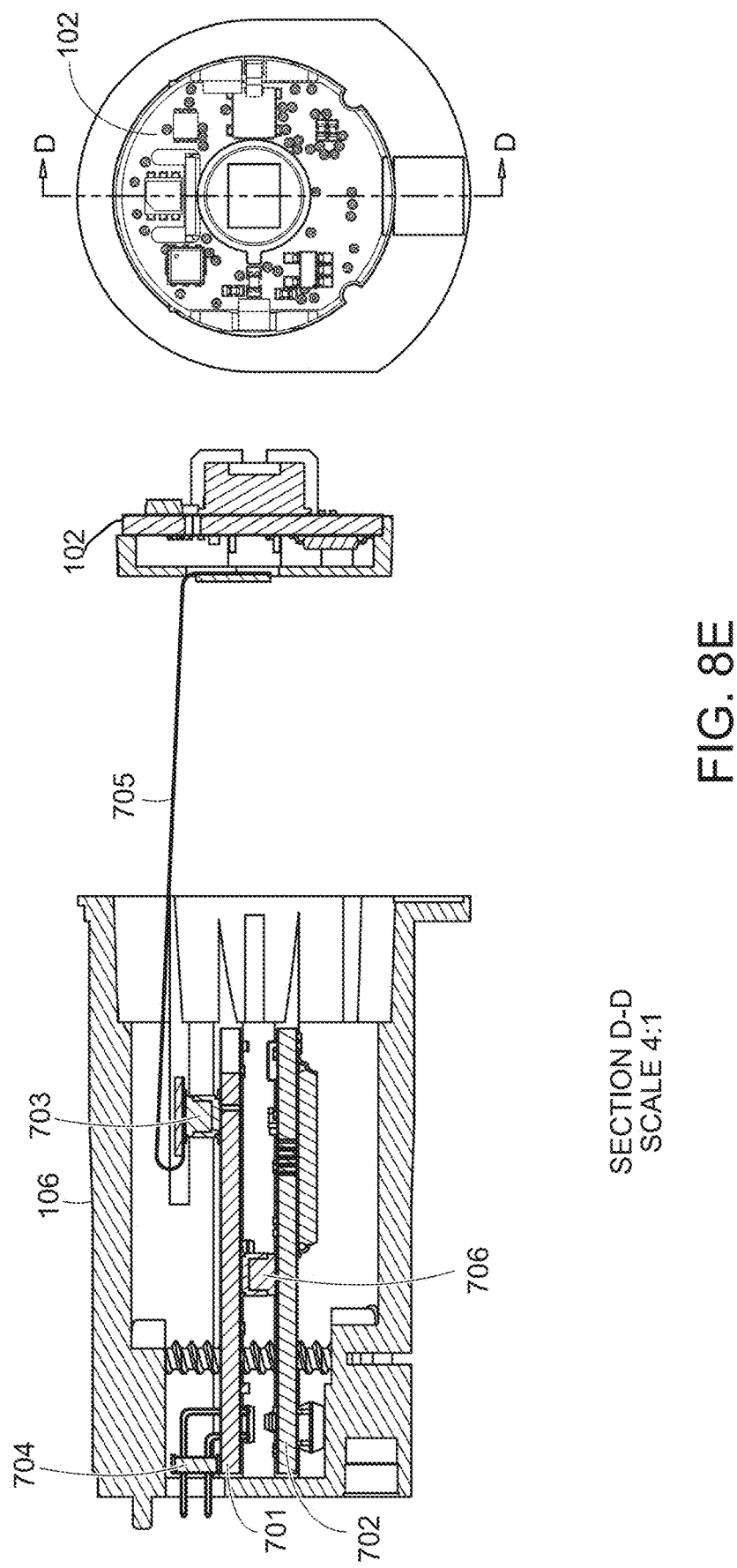

FIGS. 8A-8D illustrate a front perspective view, a back perspective view, a top view, and a side view, respectively, of the sensing device 100 during the removal of the sensor assembly 104 from the sensing device 100. FIG. 8E illustrates a cross-sectional view of the sensing device with sensing device 100 and the main enclosure 106 during the removal of the sensing assembly 104. For clarity of illustration, in FIGS. 8A-8D, the sensing device with field replaceable sensors 100 is shown without the sensor PCB carrier 103 and without the main enclosure 106. (See FIG. 3C for the sensing device with field replaceable sensors 100 during its removal.) When the sensor PCB 102 is to be removed from the main enclosure 106, the sensor assembly 104 is pulled forward, which in turn pulls the flexible jumper 705 forward, until the connection between the first end of the flexibly jumper 705 and the connector 501 on the sensor PCB 102 becomes accessible. The user then disconnects the first end of the flexible jumper 705 from the connector 501. (See FIG. 3D.) A new sensor assembly 104 can then be installed. The new sensor PCB 102 will have a plurality of sensors and also have a connector 501. The sensors on the new sensor assembly may be the same or different from the sensors on the replaced sensor assembly. The user connects the first end of the flexible jumper 705 to the connector 501 of the new sensor PCB 102, folds the flexible jumper 705 back into the main enclosure 106, couples the new sensor assembly 104 to the main enclosure 106, and moves the sensing device cover 101 back into place. Throughout the process of replacing the sensor assembly 104, the second end of the flexible jumper 705 remains coupled to the connector 703 of the power supply PCB 701. The microcontroller on the MCU PCB 702 reads from the read-only chip on the sensor PCB 102 the description of the sensors on the new sensor PCB 102 and can automatically configure itself to interact with the sensors present on the sensor PCB 102. If necessary, the microcontroller may be remotely reprogrammed in order to interact with the new sensors.

Since only the sensor assembly 104 need to be removed from the main enclosure 106, exposure to hazards for the remaining components of the sensing device 100 is reduced. With only one connection between the sensor assembly 104 and the remaining components of the sensing device via the flexible jumper 705, the ease of replacement of the sensor assembly 104 is increased.

During the replacement of the sensor assembly 104, power to the sensing device 100 is automatically connected and disconnected by a microswitch 503 on the sensor PCB 102. FIGS. 9A-1 through 9B-3 illustrate in more detail the microswitch 503 of the sensor PCB 102. FIGS. 9A-1 through 9A-3 illustrate a close-up view of the microswitch 503 in an on position. FIG. 9A-2 illustrates a cross-section view of the sensor PCB 102 along the E-E axis shown in FIG. 9A-1. FIG. 9A-3 illustrates a detailed view of section F shown in FIG. 9A-2. FIGS. 9B-1 through 9B-3 illustrate a close-up view of the microswitch 503 in an off position. FIG. 9B-2 illustrates a cross-sectional view of the sensor PCB 102 in the main enclosure 106 along the B-B axis shown in FIG. 9B-1. FIG. 9B-3 illustrates a detailed view of section C shown in FIG. 9B-2. The microswitch 503 includes a lever 901 configured to toggle between an up position (see FIG. 9A-3) and an off position (see FIG. 9B-3). When the lever 901 is in the on position, the circuit to the power supply is closed, and power is supplied to the sensing device 100. When the lever 901 is in the off position, the circuit with the power supply is opened, and no power is supplied to the sensing device 100. As illustrated in FIG. 9B-3, when in the off position, the lever 901 extends beyond the boundaries of the sensor PCB 102 (see also FIG. 5C). The lever 901 resides within a particular slot 603A of the plurality of slots 603 in the sensor PCB carrier 103 (see FIG. 4J.), which prevents the lever 901 from being accidentally toggled.

As illustrated in FIG. 9A-3, when installed in the main enclosure 106, the slot 603A engages a particular protrusion (not shown) in the main enclosure 106, such that the protrusion reside within the slot 603A. This causes the lever 901 to toggle into the on position. Thus, when installed, power is supplied to the sensing device sensors 100. As illustrated in FIG. 9B-3, when the sensor assembly 104 is removed from the main enclosure 106, such as during the replacement of the sensor assembly 104, the slot 603A disengages from the particular protrusion. This causes the lever 901 to toggle into the off position, which stops the supply of power to the sensing device 100. When a sensor assembly 104 is reinstalled in the main enclosure 106, such as after its replacement, the sensor assembly 104 is reinserted into the main enclosure 106. The slot 603A in the new carrier 103 engages the particular protrusion, in turn causing the lever 901 of the new sensor PCB 102 to toggle into the on position.

Thus, as the sensor assembly 104 is removed from the main enclosure 106, power to the entire sensing device 100 is automatically turned off, allowing the replacement of sensor assembly 104 to be performed safely and without the need to disengage any wirings in the building infrastructure. Power spikes to the sensor assembly 104 or the PCB assembly 105 are avoided. Power is not supplied to the sensing device 100 until the sensor assembly 104 is reinstalled into the main enclosure 106, and the lever 901 toggles into the on position, again without the need to engage with any of the wirings in the building infrastructure.

Once the new sensor assembly 104 is installed and power is supplied to the sensing device 100, the MCU PCB 702 in the PCB assembly 105 reads the new sensor PCB 102, as described above, and obtains information pertaining to the sensors on the new sensor PCB 102. In this embodiment, software executed by upstream distributed computing devices obtain sensor data collected by the MCU PCB 702 and performs various functions using this sensor data.

Figure 10A:
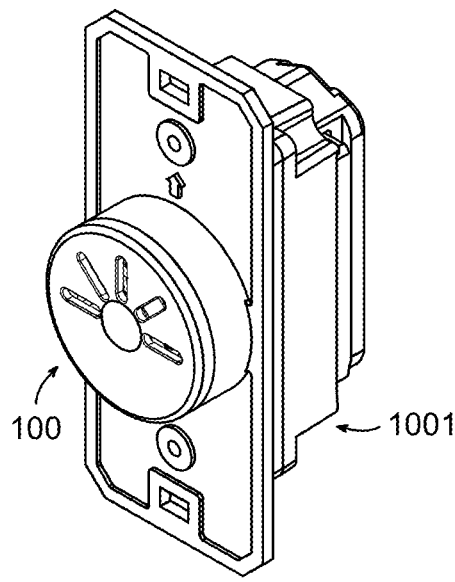
Figure 10B:
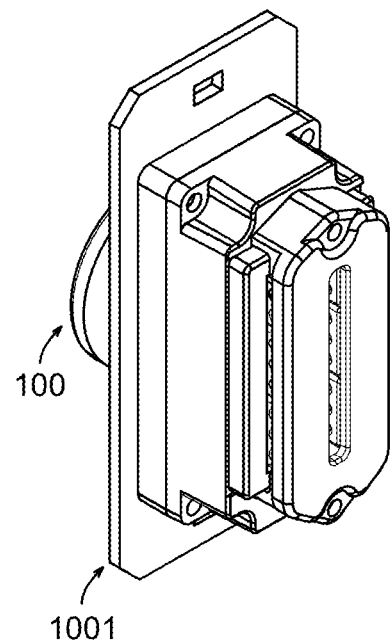
Figure 10F:
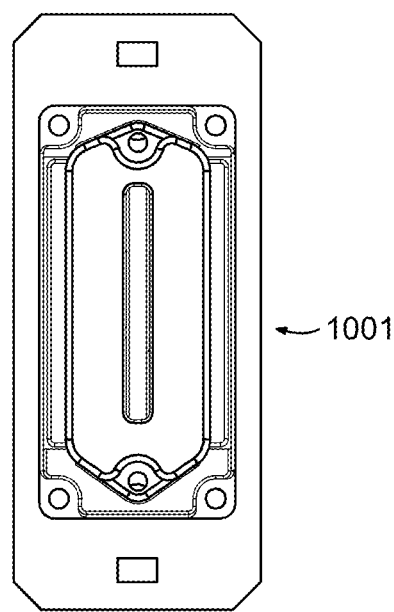

In some alternative embodiments, the sensing device with field replaceable sensors 100 is installed in a variety of other form factors. FIGS. 10A-10H illustrate the sensing device with field replaceable sensors 100 in a J-box 1001 according to one alternative embodiment. FIGS. 10A-10B illustrate a front perspective view and a back perspective view, respectively, of the sensing device with field replaceable sensors 100 in a J-box 1001. FIG. 10C-10H illustrate a front view, a left side view, a right side view, a back view, a top view, and a bottom view, respectively, of the sensing device with field replaceable sensors 100 in a J-box 1001. FIG. 11 illustrates an exploded view of the sensing device with field replaceable sensors 100 in a J-box 1001. In this alternative embodiment, the sensor assembly 104 and the PCB assembly 105 have the same components as above. To accommodate the J-box 1001, the PCB assembly 105 is oriented to fit within the cavity of the J-box 1001. The connection between the flexible jumper 705 and the connector 501 (not visible) is the same as described above, except the flexible jumper 705 is folded to accommodate the orientation of the PCB assembly 105.

Figure 12A:
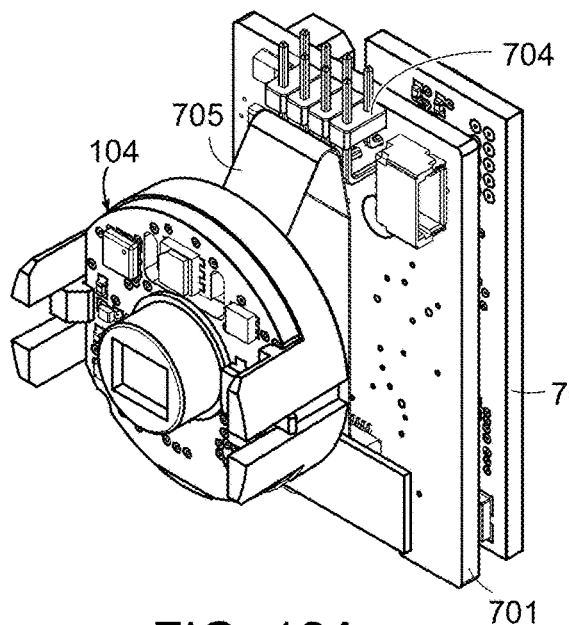
FIGS. 12A-12E illustrate the sensing device with field replaceable sensors in an installed position when used with a J-box.
Figure 12D:
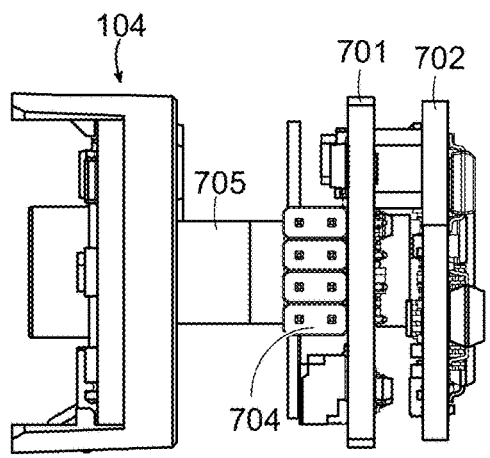
Figure 12B:
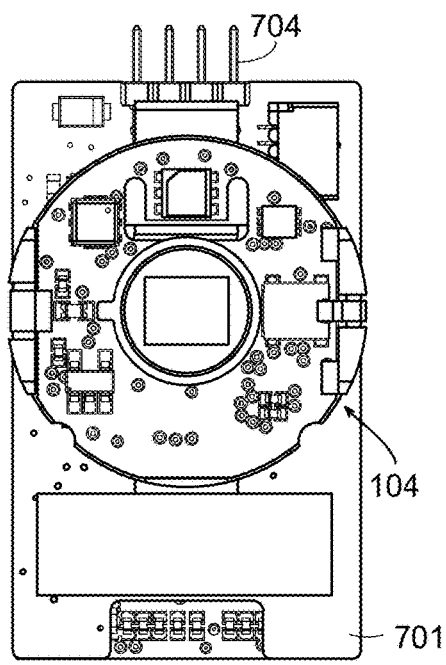
Figure 12C:
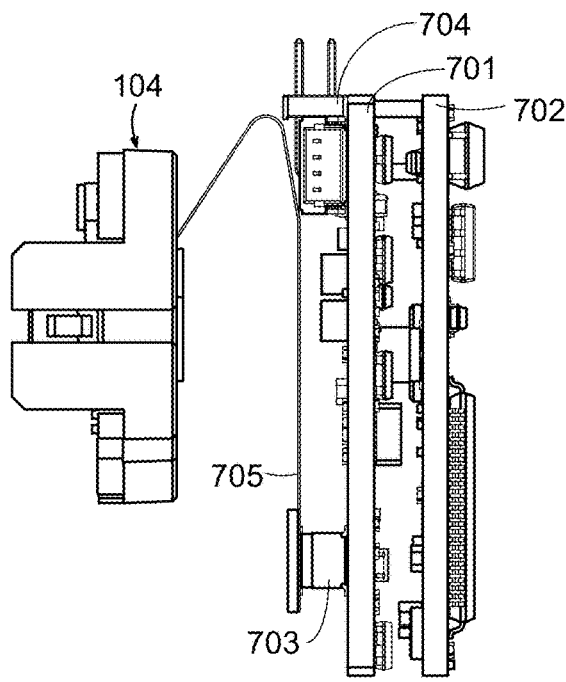
Figure 12E:
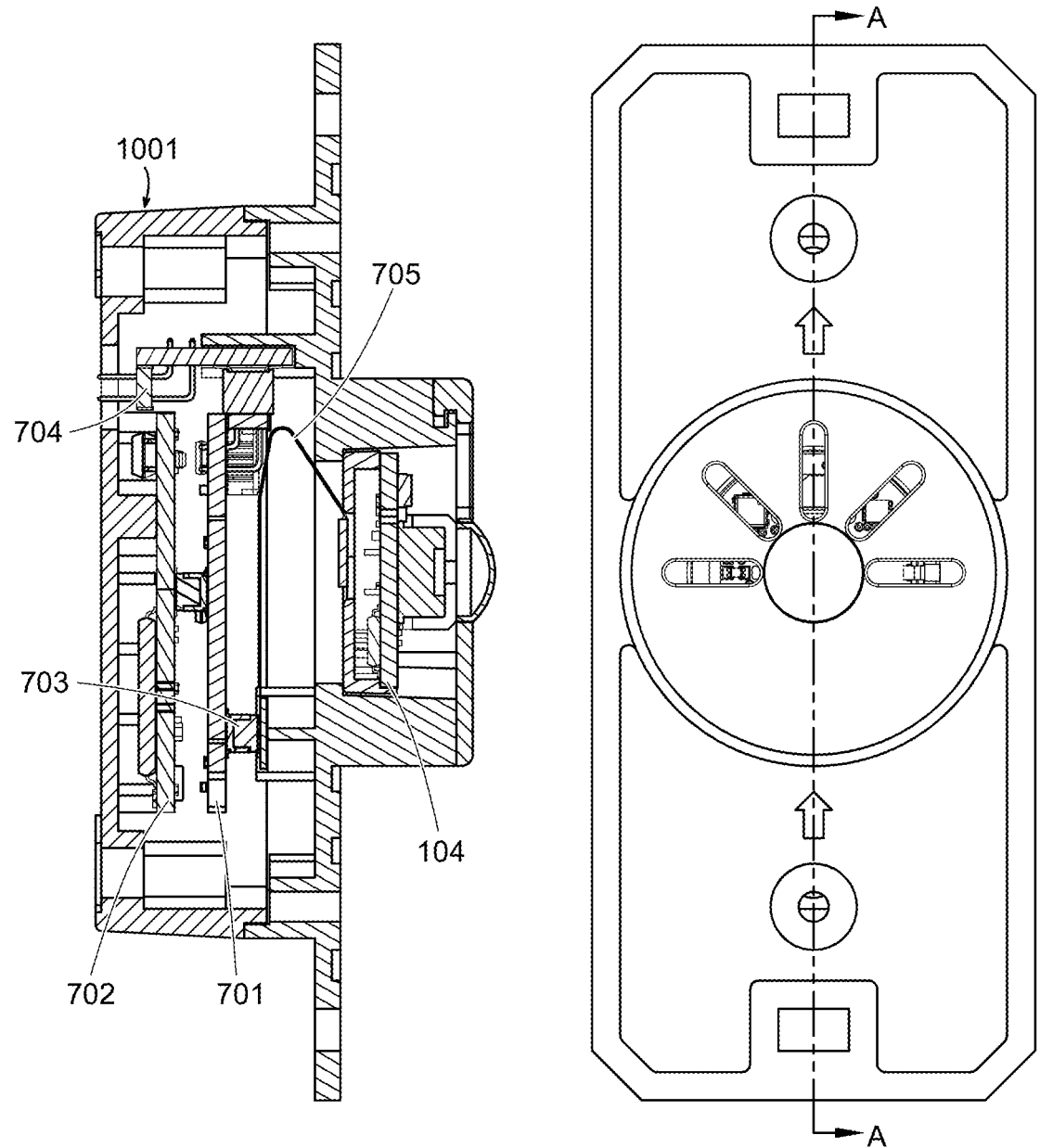

FIGS. 12A-12E illustrate the sensing device with field replaceable sensors 100 in an installed position when used with a J-box 1001. FIGS. 12A-12D illustrate a front perspective view, a front view, a side view, and a top view, respectively, of the sensing device with field replaceable sensors 100 in an installed position when used with a J-box 1001. FIG. 12E illustrates a cross-sectional view of the sensing device with field replaceable sensors 100 along axis A-A as installed in a J-box 1001. The connection between the flexible jumper 705 and the connector 501 (not visible), and the folding of the flexible jumper 705 while in the installed position, are the same as described above with reference to FIGS. 7A-7E, except the folding of the flexible jumper 705 accommodates the J-box orientation of the PCB assembly 105.

FIGS. 13A-13E illustrate the sensing device with field replaceable sensors 100 during removal of the sensor assembly 104 from a J-box 1001. FIGS. 13A-13D illustrate a front perspective view, a front view, a side view, and a top view, respectively, of the sensing device with field replaceable sensors 100 during removal of the sensor assembly 104 from a J-box 1001. FIG. 13E illustrates a cross-sectional view of the sensing device with field replaceable sensors 100 during removal of the sensor assembly 104 from a J-box 1001. The connection between the flexible jumper 705 and the connector 501 (not visible), and the extension of the flexible jumper 705 during the replacement of the sensor assembly 104, are the same as described above with reference to FIGS. 8A-8E, except the extension of the flexible jumper 705 accommodates the J-box orientation of the PCB assembly 105.

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A sensing device, comprising:
    an enclosure comprising an opening at a front end of the enclosure;
    a sensor assembly comprising a plurality of sensors, the sensor assembly comprising a front side and a back side opposite the front side, the front side of the sensor assembly residing proximate to the opening at the front end of the enclosure;
    a printed circuit board (PCB) assembly residing proximate to the back side of the sensor assembly and distal to the front side of the sensor assembly; and
    a flexible jumper comprising a first end and a second end opposite to the first end, the first end coupled to the back side of the sensor assembly, the second end coupled to the PCB assembly, the flexible jumper is configured to exert pressure to the back side of the sensor assembly toward the front side of the sensor assembly;
    wherein the sensor assembly, the PCB assembly, and the flexible jumper are configured to reside within the enclosure,
    wherein the sensor assembly is configured to be decoupled from the first end of the flexible jumper and removed from the enclosure through the opening without decoupling the second end of the flexible jumper from the PCB assembly and without removing the PCB assembly from the enclosure.

2. The device of claim 1, wherein the sensor assembly comprises:
    a sensor PCB comprising the plurality of sensors; and
    a carrier coupled to the sensor PCB and configured to engage the enclosure when the sensor assembly resides within the enclosure.

3. The device of claim 1, wherein the sensor assembly comprises a sensor PCB, the sensor PCB comprising the plurality of sensors and a microswitch,
    wherein a coupling of the sensor assembly to the enclosure causes the microswitch to automatically toggle to an on position, wherein power is supplied to the sensing device,
    wherein a decoupling of the sensor assembly from the enclosure causes the microswitch to automatically toggle to an off position, wherein power to the sensing device is turned off.

4. The device of claim 1, further comprising a sensing device cover coupled to the front end of the enclosure proximate to the opening, wherein the flexible jumper is configured to exert an outward pressure on the back side of the sensor assembly when the sensor assembly is engaged with the enclosure,
    wherein when the sensing device cover is decoupled from the front end of the enclosure, the pressure exerted by the flexible jumper pushes the sensor assembly away from the enclosure and through the opening.

5. The device of claim 1, wherein the PCB assembly comprises:
    a power supply PCB; and
    a microcontroller unit (MCU) PCB coupled to the power supply PCB.

6. The device of claim 5, further comprising:
    an input-output (IO) module coupled to the power supply PCB and to a building infrastructure.

7. The device of claim 1, further comprising a second sensor assembly comprising a second plurality of sensors, the second sensor assembly configured to be coupled to the first end of the flexible jumper after the sensor assembly is decoupled from the first end of the flexible flexibly-jumper.

8. The device of claim 7, wherein the second sensor assembly further comprises a read-only chip, the read-only chip comprising a description of the second plurality of sensors,
    wherein the PCB assembly comprises a microcontroller configured to read the description on the read-only chip when the second sensor assembly is coupled to the first end of the flexible jumper.

9. A method for replacing sensors in the field, comprising:
    decoupling a first sensor assembly of a sensing device from an enclosure, the enclosure comprising an opening at a front end of the enclosure, the first sensor assembly comprising a first plurality of sensors, the sensor assembly comprising a front side and a back side opposite the front side, the front side of the sensor assembly residing proximate to the opening at the front end of the enclosure, the first sensor assembly coupled to a first end of a flexible jumper, wherein a second end of the flexible jumper is coupled to a printed circuit board (PCB) assembly residing within the enclosure, the PCB assembly residing proximate to the back side of the sensor assembly and distal to the front side of the sensor assembly, the flexible jumper configured to exert pressure to the back side of the sensor assembly toward the front side of the sensor assembly, wherein the pressure exerted by the flexible jumper pushes the sensor assembly away from the enclosure and through the opening;

pulling the first sensor assembly away from the enclosure;

detaching the first end of the flexible jumper from the first sensor assembly without detaching the second end of the flexibly jumper from the PCB assembly and without removing the PCB assembly from the enclosure;

attaching a second sensor assembly to the first end of the flexible jumper, the second sensor assembly comprising a second plurality of sensors; and coupling the second sensor assembly to the enclosure.

10. The method of claim 9, wherein the first sensor assembly comprises:
a sensor PCB comprising the first plurality of sensors; and
a carrier coupled to the sensor PCB and configured to couple to the enclosure when the first sensor assembly resides within the enclosure.

11. The method of claim 9, wherein the first sensor assembly comprises a first sensor PCB, the first sensor PCB comprising the first plurality of sensors and a first microswitch,
wherein the decoupling of the first sensor assembly from the enclosure causes the first microswitch to automatically toggle to an off position, wherein power to the sensing device is turned off.

12. The method of claim 9, wherein the second sensor assembly comprises a second sensor PCB, the second sensor PCB comprising the second plurality of sensors and a second microswitch,
wherein the coupling of the second sensor assembly to the enclosure causes the second microswitch to automatically toggle to an on position, wherein power to the sensing device is supplied to the sensing device.

13. The method of claim 9, wherein the sensing device further comprises a sensing device cover coupled to the front end of the enclosure proximate to the opening, wherein the flexible jumper is configured to exert an outward pressure on the back side of the first sensor assembly when the first sensor assembly is engaged with the enclosure,
wherein when the sensing device cover is decoupled from the enclosure, the pressure exerted by the flexible jumper pushes the first sensor assembly away from the enclosure and through the opening.

14. The method of claim 9, wherein the PCB assembly comprises:
a power supply PCB; and
a microcontroller unit (MCU) PCB coupled to the power supply PCB.

15. The method of claim 14, wherein the sensing device further comprises:
an input-output (IO) module coupled to the power supply PCB and to a building infrastructure.

16. The method of claim 9, wherein the second sensor assembly further comprises a read-only chip, the read-only chip comprising a description of the second plurality of sensors,
wherein the PCB assembly comprises a microcontroller configured to read the description on the read-only chip when the second sensor assembly is attached to the first end of the flexible jumper.

* * * * *